Figure 1:
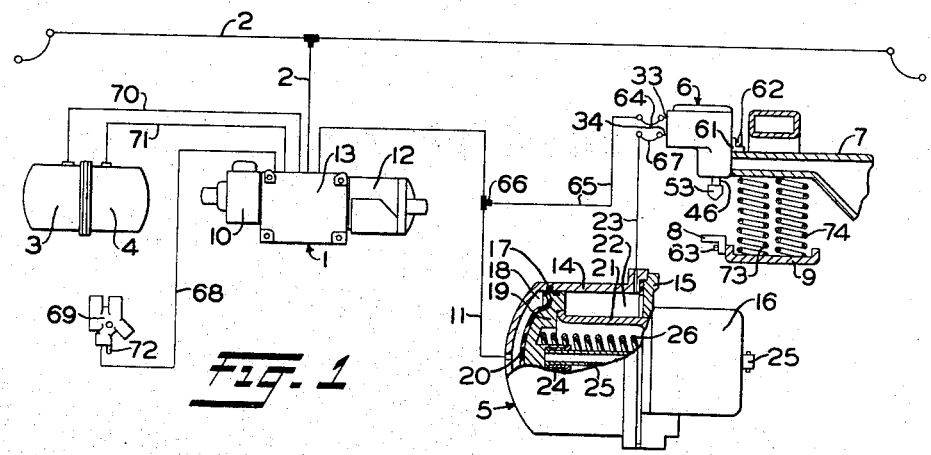

Sept. 12, 1967  C. L. WEBER, JR  3,341,257
EMPTY AND LOAD RAILWAY BRAKE CONTROL APPARATUS
Filed Sept. 29, 1965  3 Sheets-Sheet 1

INVENTOR.
CHARLES L. WEBER JR.
BY
*O. O. Steinmiller*
ATTORNEY

Sept. 12, 1967   C. L. WEBER, JR   3,341,257
EMPTY AND LOAD RAILWAY BRAKE CONTROL APPARATUS
Filed Sept. 29, 1965   3 Sheets-Sheet 2

INVENTOR.
CHARLES L. WEBER JR.
BY
*A. A. Steinmiller*
ATTORNEY

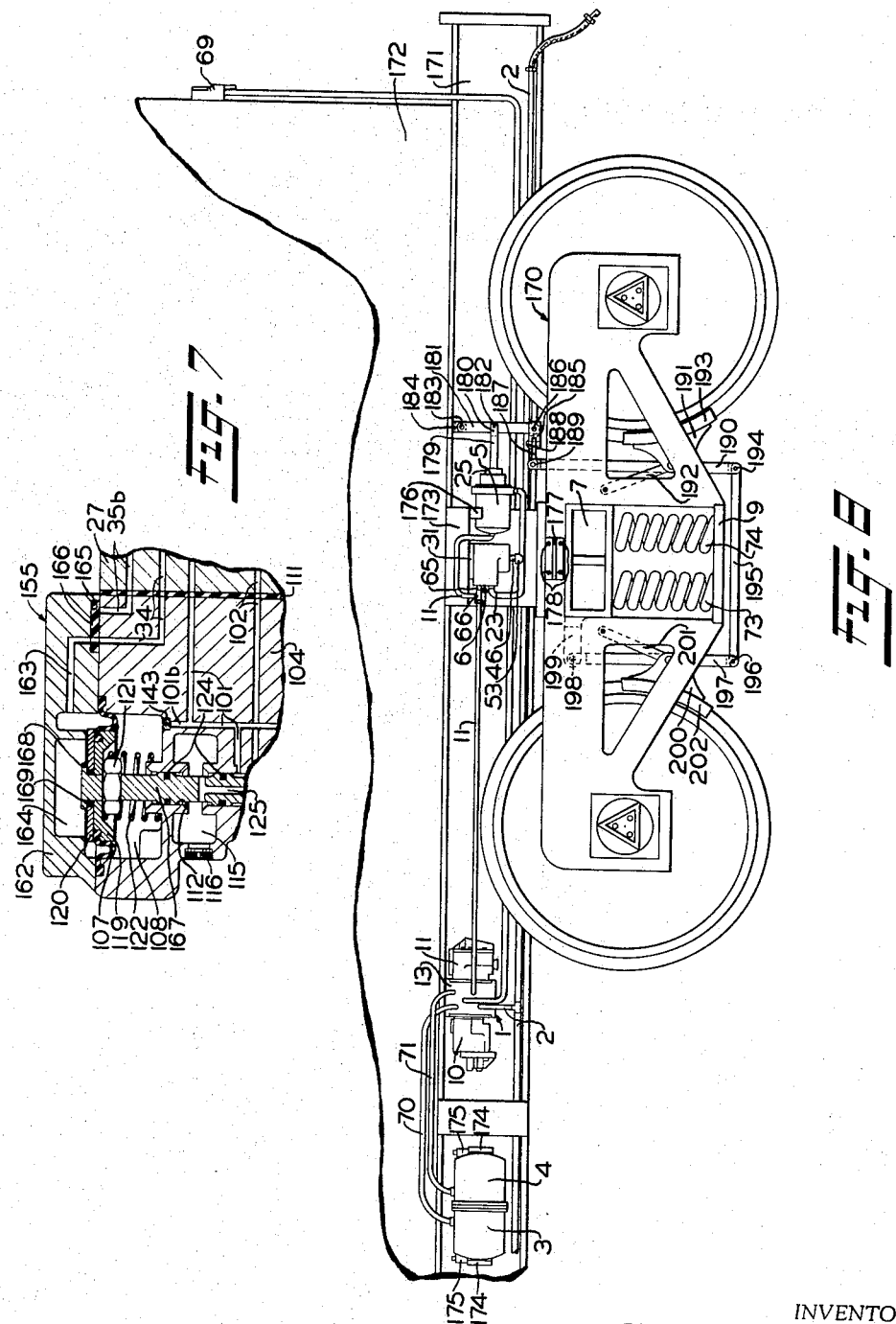

United States Patent Office 3,341,257
Patented Sept. 12, 1967

3,341,257
EMPTY AND LOAD RAILWAY BRAKE CONTROL APPARATUS
Charles L. Weber, Jr., Irwin, Pa., assignor to Westinghouse Air Brake Company, Wilmerding, Pa., a corporation of Pennsylvania
Filed Sept. 29, 1965, Ser. No. 491,132
18 Claims. (Cl. 303—22)

This invention relates to fluid pressure operated empty and load brake apparatus for railway vehicles and more particularly to a simple and inexpensive fluid pressure operated empty and load brake apparatus embodying means for automatically adjusting the degree of a brake application each time a brake application is effected in accordance with the load carried on the vehicle.

The fluid pressure operated empty and load brake apparatus heretofore proposed for railway vehicles has usually comprised a change-over valve device carried by the body of the vehicle and a load measuring or strut cylinder device which is installed on the end of a truck bolster and connected by flexible conduits to the change-over valve device since the truck bolster constitutes a part of the vehicle truck and therefore turns relative to the vehicle body as the vehicle travels around a curve. The initial cost of such fluid pressure operated empty and load brake apparatus is relatively high and the maintenance cost, including that of the conduits connecting the change-over valve device and the strut cylinder device, is often prohibitive.

Furthermore, most of the heretofore proposed fluid pressure operated empty and load brake apparatus for railway vehicles are automatically conditioned or changed over to provide either empty or load braking accordingly as the vehicle is empty or loaded only while the train brake pipe pressure is increasing during charging subsequent to a reduction in the pressure in the train brake pipe to substantially zero which is not obtained when a full or partial service application is effected but only when an emergency application is effected.

Accordingly, it is the general purpose of this invention to provide a simple and inexpensive fluid pressure operated empty and load brake apparatus in which the functions of the change-over valve device and the load measuring strut cylinder device of heretofore proposed empty and load brake apparatus for railway vehicles are combined into a single inexpensive load measuring valve device that may be installed on the end of a truck bolster and connected by flexible conduits or hose to the conventional AB fluid pressure brake equipment, such as that shown and described in Patent 2,031,213, issued February 18, 1936, to Clyde C. Farmer, or may be installed on the vehicle body and connected by rigid conduits, such as, for example, pipe to the conventional AB fluid pressure operated brake equipment.

The above-mentioned load measuring valve device constituting the present invention can be added to a railway freight car presently provided with a standard single capacity brake equipment, such as the well-known AB freight brake equipment, to convert the brake equipment on the car to a double capacity empty and load freight brake equipment without adding any additional fluid pressure storage reservoir or brake rigging. Moreover, it can be used to replace the more costly and complicated change-over valve device and the corresponding strut cylinder device which, together with either an empty brake cylinder device and a load brake cylinder device, or a compensating type of brake cylinder device, and a control valve device, such as the well-known AB control valve device, constitute principal elements of some of the empty and load freight brake equipments presently installed on a large number of freight cars owned by American railroads. By effecting such replacement, these cars may be provided with an upgraded empty and load brake equipment which is more simple in operation and less costly to maintain without the necessity of effecting any changes in or additions to the fluid pressure storage reservoirs and brake rigging presently on the freight car.

More specifically, this invention comprises a load-sensing valve device which is operated each time a brake application is made to move an automatically retractable strut piston and piston rod into contact with a stop, the distance moved by the piston and piston rod varying in accordance with the load on a railway car. This distance traveled by the piston and piston rod determines whether or not fluid under pressure is supplied to a piston-type valve operable between two positions to condition a brake equipment to provide a heavy or a light braking force accordingly as the vehicle is loaded or empty.

In the accompanying drawings:

FIG. 1 is a diagrammatic view, partly in section, showing an empty and load railway freight car brake equipment constructed in accordance with one embodiment of the invention and including a novel load sensing valve device mounted on the end of a car truck bolster above a stop member carried on an unsprung part of the car, such as a truck spring plank of the side frame of a car truck, a brake control valve device, such as the well-known AB brake control valve device, and a compensating type of brake cylinder device.

Figure 2:
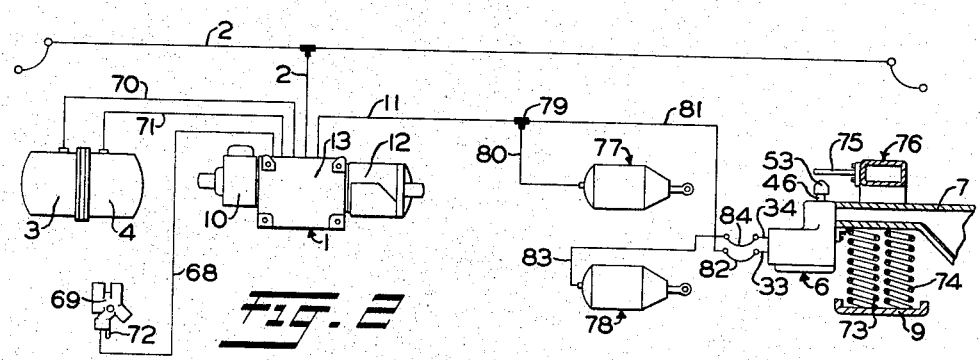

FIG. 2 is a diagrammatic view, partly in section, showing an empty and load railway freight car brake equipment constructured in accordance with a second embodiment of the invention and including the novel load sensing valve device mounted in an inverted position on the end of a car truck bolster below a stop member carried on an unsprung part of the car, such as the compression member of the truck side frame, an AB type brake control valve device, an empty brake cylinder device, and a load brake cylinder device.

Figure 3:
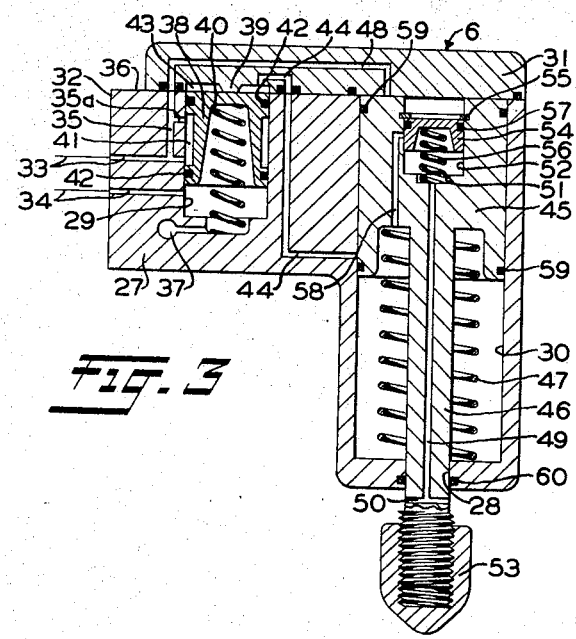

FIG. 3 is a vertical cross-sectional view, at an enlarged scale, of the novel load sensing valve device of FIG. 1 showing the structural details of this valve device.

Figure 4:
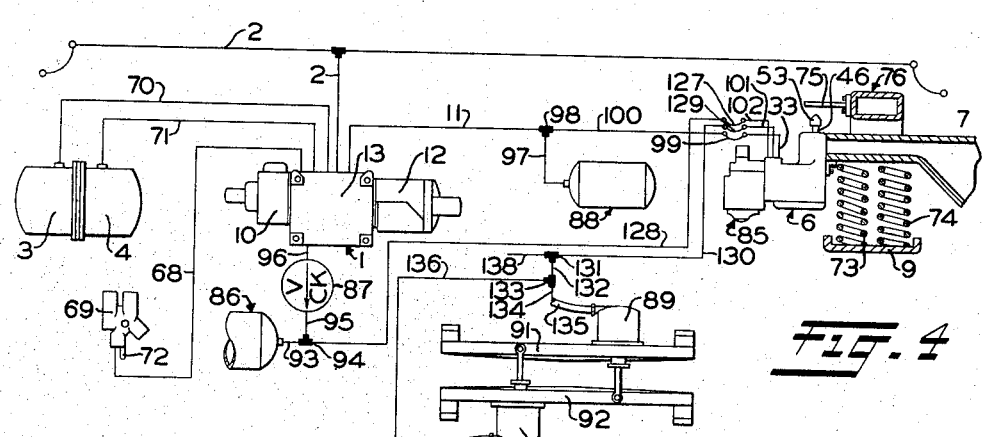

FIG. 4 is a diagrammatic view, partly in section, showing an empty and load railway freight car brake equipment constructed in accordance with a third embodiment of the invention, including a novel load sensing valve device mounted in an inverted position on the end of a car bolster, as shown in FIG. 2, which load sensing valve device has integral therewith a double diaphragm type self-lapping relay valve device, an AB type brake control valve device, an additional supply reservoir, a dummy volume, and a pair of single capacity brake cylinder devices each carried on one of a pair of brake beams provided for one truck of the freight car which brake cylinder devices replace the empty brake cylinder device and the load brake cylinder device shown in FIG. 2.

Figure 5:
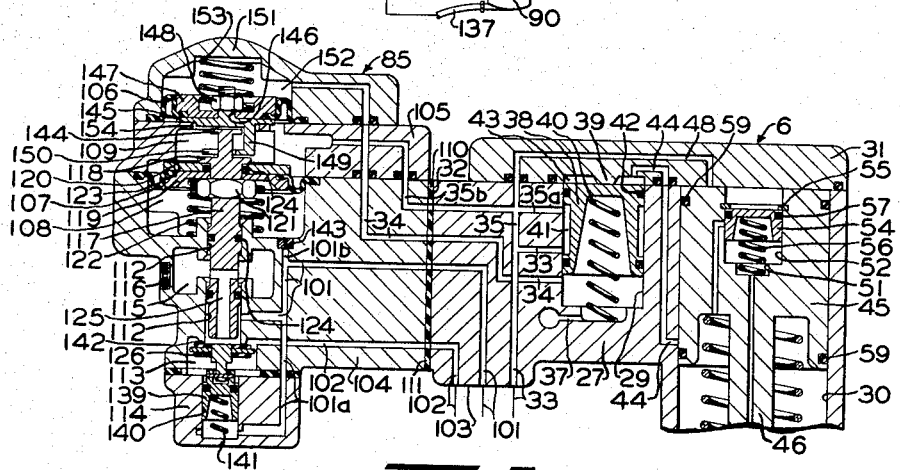

FIG. 5 is a vertical cross-sectional view, at an enlarged scale, of the combined load sensing valve device and double and diaphragm type self-lapping relay valve device shown in outline in FIG. 4, showing the structural details and interconnection between the sensing valve device and the relay valve device.

Figure 6:
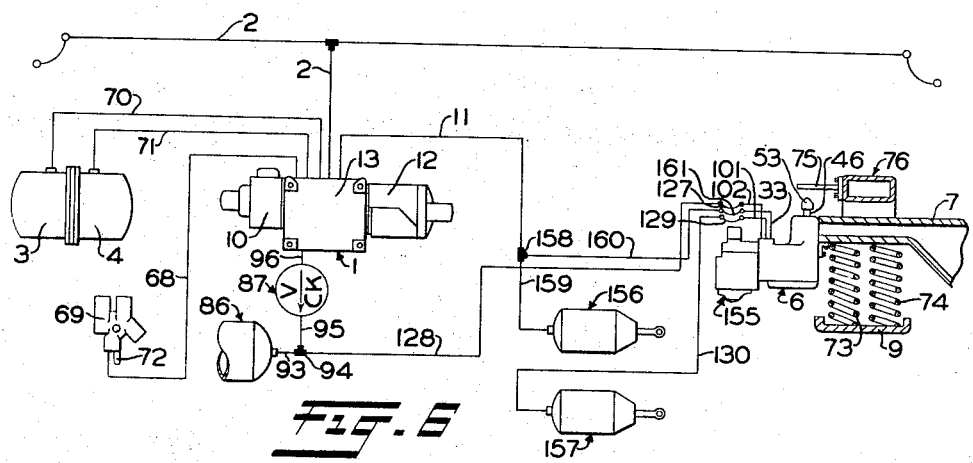

FIG. 6 is a diagrammatic view, partly in section, showing an empty and load railway freight car brake equipment constructed in accordance with a fourth embodiment of the invention, including a novel load sensing valve device mounted in an inverted position on the end of a car bolster, as shown in FIGS. 2 and 4, which load sensing valve device has integral therewith a single diaphragm type self-lapping relay valve device, an AB type brake control valve device, an additional supply reservoir, an empty brake cylinder device, and a load brake cylinder device.

FIG. 7 is a partial vertical cross-sectional view, at an enlarged scale, of a portion of the single diaphragm type self-lapping relay valve device shown in FIG. 6 showing the single diaphragm and how its opposite sides are connected to the load sensing valve device only a portion of which is shown.

FIG. 8 is a vertical view showing the manner by which the load sensing valve device and the AB type brake control valve device together with the auxiliary and emergency reservoirs associated therewith of the empty and load railway freight car brake equipment shown in FIG. 1 may be mounted on a car body and the relation of this load sensing valve device to a stop member carried on the compression member of a truck side frame.

DESCRIPTION—FIG. 1

In FIG. 1 of the drawings, there is is shown an empty and load fluid pressure brake equipment constructed in accordance with one embodiment of the invention. This empty and load fluid pressure brake equipment comprises a brake controlling valve device 1 to which is connected the usual brake pipe 2, auxiliary reservoir 3, emergency reservoir 4, a brake cylinder device 5, and a load sensing valve device 6 that is mounted on any suitable sprung part of a freight car, such as, for example, the end of a truck bolster 7, which is movable vertically relative to a stop 8 carried on an upsprung part of a railway car truck, such as, for example, a truck spring plank 9.

The brake controlling valve device 1 shown in FIG. 1 of the drawings is of the AB type which may be of substantially the same construction and have the same operating characteristics as the brake controlling valve device fully described in Patent 2,031,213 issued Feb. 18, 1936 to Clyde C. Farmer and assigned to the assignee of the present invention, in view of which it is deemed unnecessary to show and describe this valve device in detail.

Briefly, however, the brake controlling valve device 1 comprises a service portion 10 adapted to operate upon both a service and an emergency rate of reduction in pressure of fluid in brake pipe 2 for supplying fluid under pressure from the auxiliary reservoir 3 to a brake cylinder pipe 11 and thence to the brake cylinder device 5 for, upon a service reduction in brake pipe pressure, effecting a service application of the brakes on the vehicle. The brake controlling valve device 1 also comprises an emergency portion 12 which is adapted to operate only upon an emergency rate of reduction in pressure of fluid in brake pipe 2 for supplying fluid under pressure from the emergency reservoir 4 to pipe 11 and thence to brake cylinder device 5, wherein such pressure, in addition to that provided from the auxiliary reservoir 3 by operation of the service portion 10, is adapted to operate the brake cylinder device 5 for effecting an emergency application of the brakes on the vehicle. Upon recharging of the brake pipe 2, the brake controlling valve device 1 is adapted to operate to open pipe 11 to atmosphere for releasing fluid under pressure therefrom and from the brake cylinder device 5 for releasing the brakes on the railway vehicle and at the same time to effect recharging of the auxiliary reservoir 3 and the emergency reservoir 4 in the usual well-known manner. The service and emergency portions 10 and 12, respectively, of the brake controlling valve device 1 are mounted on opposite faces of a pipe bracket 13 to which all pipe connections to said valve device are made, as shown in FIG. 1 of the drawings.

The brake cylinder device 5 comprises a hollow cup-shaped casing 14 to the open end of which is secured an annular pressure head 15 from which projects a hollow cup-shaped non-pressure head 16. A brake cylinder piston 17 is slidably mounted in the casing 14 and at one side or the front side thereof is the usual or main pressure chamber 18, to which the pipe 11 is connected. The brake cylinder piston 17 comprises a piston head 19 to one face of which is connected a flexible packing cup 20 for preventing leakage of fluid under pressure from the pressure chamber 18 to the opposite side of the piston. Secured at one end to and projecting from the piston 17 in a direction away from the pressure chamber 18 is a hollow stem 21 the opposite end of which is provided with a ring packing (not shown) which is slidable in the non-pressure head 16 for preventing leakage of fluid under pressure from a compensating pressure chamber 22 formed around said stem 21 between the pressure head 15 and the piston 17, to a non-pressure chamber (not shown) formed within said stem 21 and open to the interior of the non-pressure head 16 and thence to atmosphere through a port (not shown) in the non-pressure head 16. The chamber 22 is open to a pipe 23 through which fluid under pressure is adapted to be supplied to and released from said chamber by operation of the brake controlling valve device 1 and the load sensing valve device 6 in a manner hereinafter described.

The piston head 19 is provided with a hollow boss 24 projecting into the hollow stem 21 in coaxial relation to the head 19 and stem 21, and one end of a hollow rod 25 is secured to the hollow boss 24. The hollow rod 25 extends through the non-pressure chamber in the non-pressure head to the exterior thereof. This hollow rod 25 accommodates the usual push rod (not shown) for connecting the piston 17 to the brake rigging (not shown) of the railway vehicle. Encircling the hollow rod 25 is a brake cylinder piston release spring 26, one end of which bears against the piston head 19 for moving the brake cylinder piston 17 to its brake release position, in which it is shown in FIG. 1 of the drawings. The opposite end (not shown) of the release spring 26 is supported on the non-pressure head.

The load sensing valve device 6, as shown in cross section in FIG. 3, comprises an inverted L-shaped body 27 in which is provided in spaced-apart parallel relationship a bore 28 and a bottom bore 29. Also provided in the L-shaped body 27 coaxial with the bore 28 is a counterbore 30 the open end of which is closed by a cover member 31 which also serves to close the open end of the bottom bore 29, the cover member 31 being secured to body 27 by any suitable means (not shown).

Extending from a vertical face 32 formed on the left-hand side of the L-shaped body 27 through the body and opening at the wall surface of the bottom bore 29, one above the other, are two ports and passageways 33 and 34. The passageway 33 has a branch passageway 35 extending through the body 27 and opening at a flat surface 36 formed on the top of the L-shaped body 27 to which flat surface the cover member 31 is secured. The branch passageway 35 has a branch 35a that opens at the wall surface of the bottom bore 29 a chosen distance above the location at which the passageway 33 opens at the wall surface of this bottom bore, the lower end of which is open to atmosphere via a passageway 37.

A cup-shaped piston-type valve 38 is slidably mounted in the bottom bore 29 and is normally biased against a stop 39 formed on the cover member 31 by a spring 40 disposed between the lower side of the cup-shaped piston valve 38 and the lower end of the bottom bore 29 so that an elongated peripheral annular groove 41 formed on the piston valve 38 normally establishes a communication between the branch passageway 35a and the passageway 33 via the bottom bore 29. Adjacent each of its opposite ends the cup-shaped piston valve 38 is provided with a peripheral annular groove in which is disposed an O-ring 42 to respectively prevent leakage of fluid under pressure from the elongated peripheral annular groove 41 to atmosphere via the bottom bore 29 and passageway 37, and to a chamber 43 above the piston 38 into which chamber 43 opens one end of a passageway 44 that extends through the cover member 31 and the L-shaped body 27 and opens at its opposite end at the wall surface of the counterbore 30 intermediate the ends thereof.

A strut piston 45 slidably disposed in the counterbore 30 and having a piston rod 46 extending through the bore 28 is normally biased against the cover member 31 by a spring 47 disposed in surrounding relation to the piston rod 46 and interposed between the lower face of the strut piston 45 and the lower end of the counterbore 30. Formed in the cover member 31 is a passageway 48 one end of which opens at the lower side of this cover member above the strut piston 45 and the opposite end of which registers with the upper end of the branch passageway 35 in the L-shaped body 27.

The strut piston 45 and piston rod 46 are provided with a bottom bore 49 the lower end of which registers with a crossbore 50 and the upper end of which opens into a first coaxial counterbore 51 in the strut piston 45 which is also provided with a second coaxial counterbore 52 of larger diameter. The lower end of the piston rod 46 is provided with external screw threads that have screw-threaded engagement with internal screw threads fromed in a stop contact member 53 carried on the lower end of the piston rod.

Slidably mounted in the counterbore 52 is a cup-shaped reset piston 54 which is normally biased upward into contact with a snap ring 55 that is inserted in an annular groove formed in the wall surface of the counterbore 52 by a spring 56 that is interposed between the reset piston 54 and the bottom of the counterbore 51 in the strut piston 45. The strength of the spring 56 exceeds that of the hereinbefore-mentioned spring 47 whereby, upon the supply of fluid under pressure via the passageway 48, in a manner hereinafter described in detail, to the upper face of the strut piston 45, the piston 45 and the piston rod 46 are moved downward until the stop contact member 53 carried on the lower end of the piston rod 46 is moved into contact with the stop 8 (FIG. 1) before the reset piston 54 is moved downward against the yielding resistance of the spring 56. The reset piston 54 is provided with a peripheral annular groove in which is disposed an O-ring 57 which, until the reset piston 54 is moved downward a chosen distance against the yielding resistance of the spring 56, prevents the flow of fluid under pressure from the upper face of the strut piston 45 to a passageway 58 formed in the strut piston 45 which passageway at one end opens at the wall surface of the counterbore 52 and at the opposite end opens at the lower face of the piston 45.

The strut piston 45 is provided adjacent each end with a peripheral annular groove in which is disposed an O-ring 59 that cooperates with the wall surface of the counterbore 30 to form a seal therewith to prevent leakage of fluid under pressure from the upper to the lower face of the strut piston 45 along the peripheral surface of the piston.

The wall of the bore 28 is provided with an annular groove in which is disposed an O-ring 60 which cooperates with the peripheral surface of the piston rod 46 to form a seal therewith to prevent flow of fluid under pressure from the lower face of the strut piston 45 to atmosphere.

As shown in FIG. 1, the load sensing valve device 6 is secured to one end of the truck bolster 7 by means of an angle bracket 61 and a plurality of cap screws 62, two of which appear in FIG. 1 so that the stop contact member 53 is in alignment with the stop 8 that is secured to the truck spring plank 9 by means of a pair of cap screws 63 one of which appears in FIG. 1.

Since the load sensing valve device 6 is carried on the end of the truck bolster 7, which is a part of the vehicle truck and therefore turns relative to the vehicle body as the railway vehicle travels around a curved, it is necessary that a resilient connection be provided between the load sensing valve device 6 and the hereinbefore-mentioned pipes 11 and 23. Therefore, the passageway 33 in the L-shaped body 27 of the load sensing valve device 6 is connected by a correspondingly numbered pipe to one end of a first flexible hose 64 the opposite end of which is connected to one end of a pipe 65. The other end of the pipe 65 is connected to the side outlet of a pipe T 66 that is disposed in the brake cylinder pipe 11 between the brake controlling valve 1 and the brake cylinder device 5. Likewise, the passageway 34 in the L-shaped body 27 of the load sensing valve device 6 is connected by a correspondingly numbered pipe to one end of a second flexible hose 67 the opposite end of which is connected to one end of the pipe 23.

The brake cylinder exhaust port of the brake controlling valve device 1 is connected by a pipe 68 to a pressure retaining valve device 69 the construction of which may be substantially the same as that shown and described in United States Patent 2,204,796 issued June 18, 1940 to Clyde C. Farmer and assigned to the assignee of the present application.

OPERATION—FIG. 1

*Initial charging*

In initially charging the empty and load brake equipment shown in FIG. 1 of the drawings, fluid under pressure supplied to the brake pipe 2 by the brake valve device (not shown) on the locomotive flows to the brake controlling device 1 and thence through this valve device and pipes 70 and 71 to the auxiliary and emergency reservoirs 3 and 4, respectively, to effect charging of these reservoirs in the usual well-known manner. At this time the pressure chamber 18 in the brake cylinder device 5 at the left-hand side of brake cylinder piston 17 is open to atmosphere via brake cylinder pipe 11 having pipe T 66 therein, the brake controlling valve device 1 the service and emergency portions 10 and 12 of which are, respectively, in their release position, the pipe 68, and the pressure retaining valve device 69 a handle 72 of which it may be assumed occupies its "direct release" position in which the pipe 68 is open directly to atmosphere.

Also, at this time, the compensating pressure chamber 22 in the brake cylinder device 5 at the right-hand side of the brake cylinder piston 17 is open to atmosphere via pipe 23, flexible hose 67, pipe and passageway 34 which opens at the wall surface of the bottom bore 29 below the piston-type valve 38 (FIG. 3) while it occupies the position in which it is shown, the bottom bore 29, and passageway 37.

*Service application of the brakes on an empty vehicle*

When it is desired to effect a service application of the brakes, the fluid pressure in the brake pipe 2 will be reduced in the usual manner to cause the brake controlling valve device 1 to effect the supply of fluid under pressure from the auxiliary reservoir 3 to the brake cylinder pipe 11. Fluid under pressure thus supplied to the brake cylinder pipe 11 will flow to the main pressure chamber 18 of the brake cylinder device 5, and will also flow from the pipe 11 to the upper face of the strut piston 45 via the side outlet of pipe T 66, pipe 65, flexible hose 64, pipe and corresponding passageway 33, passageway 35 and passageway 48.

Fluid under pressure supplied to the upper face of the strut piston 45 in the manner just described is effective to move this piston and the piston rod 46 downward against the yielding resistance of the spring 47.

Since the vehicle is empty, the strut piston 45 and piston rod 46 will thus be moved downward until the lower end of the strut piston contacts the lower end of the counterbore 30 which occurs substantially simultaneously as the stop contact member 53 carried on the lower end of the piston rod 46 is moved into contact with the stop 8 carried on the truck spring plank 9.

When the strut piston 45 is moved downward to the position in which the lower end thereof is in contact with the lower end of the counterbore 30, the upper O-ring 59 carried by the strut piston 45 is in a position just below the opening of the passageway 44 at the wall surface of the counterbore 30. Therefore, the fluid under pressure supplied from the brake cylinder pipe 11 to the upper face of the strut piston 45 will now flow to the chamber 43 above the piston type valve 38 via the passageway 44. When the pressure of the fluid supplied to the chamber 43 increases sufficiently to overcome the initial resistance of the spring 40, the piston-type valve 38 will be moved downward against the yielding resistance of the spring 40 as the pressure in the chamber 43 continues to increase until the lower end of the piston-type valve 38 is moved into contact with the lower end of the bottom bore 29.

When the piston-type valve 38 is moved from the position in which it is shown in FIG. 3 of the drawings downward to the position in which the lower end thereof abuts the lower end of the bottom bore 29, the elongated peripheral annular groove 41 cuts off comunication between the branch 35a and the passageway 33 and establishes a communication between the passageway 33 and the passageway 34.

Subsequent to the downward movement of the piston-type valve 38 to the position in which the elongated peripheral annular groove 41 thereon establishes a communication between the passageways 33 and 34, fluid under pressure supplied by the brake controlling valve device 1 to the passageway 33, as described above, flows from the passageway 33 to the compensating pressure chamber 22 in the brake cylinder device 5 (FIG. 1) via elongated peripheral annular groove 41, passageway and pipe 34, flexible hose 67, and pipe 23. With the same degree of fluid pressure in main pressure chamber 18 and in compensating pressure chamber 22 of the brake cylinder device 5, the brakes on the empty vehicle, for a given reduction in pressure of the fluid in the brake pipe 2, will therefore be applied to a degree in accordance with the differential of the fluid pressure forces present in the main pressure chamber 18 and the compensating pressure chamber 22 and acting on the unequal opposing effective areas on the opposite sides of the brake cylinder piston 17.

The fluid under pressure supplied from the brake cylinder pipe 11 to the upper face of the strut piston 45, now in the position in which the lower end thereof abuts the lower end of counterbore 30, and to the upper face of the reset piston 54, in the manner described above, will increase the fluid pressure force acting on the upper face of the reset piston 54 until this force is sufficient to move the reset piston 54 downward against the yielding resistance of the heavy spring 56 until the O-ring 57 carried by the reset piston 54 is disposed below the location at which the upper end of the passageway 58 opens at the wall surface of the counterbore 52 in strut piston 45.

Subsequent to the reset piston 54 being moved downward to the position in which the O-ring 57 carried thereby is disposed below the location at which the upper end of the passageway 58 opens at the wall surface of the counterbore 5a in the strut piston 45, the fluid under pressure being supplied by the brake controlling valve device 1 to the brake cylinder pipe 11 and present above the reset piston 54 and strut piston 45 flows via the passageway 58 to the lower face of the strut piston 45 until fluid under pressure acting on the lower face of the strut piston 45 is the same as that acting on the upper face or in other words the pressures on the opposite faces are equalized.

Subsequent to equalization of the pressure on the opposite faces of the strut piston 45, the strut piston 45 and piston rod 46 are moved upward by the spring 47 from the position in which the lower end of strut piston 45 abuts the lower end of the counterbore 30 to the position in which the strut piston 45 and piston rod 46 are shown in FIG. 3. This upward movement of the strut piston 45 and piston rod 46 is effective to move the stop contact member 53 carried on the lower end of the piston rod 46 upward away from the stop 8 carried on the truck spring plank 9. Consequently, vibration of the vehicle while in motion will not cause the stop contact member 53 to rub on the stop 8 and thereby produce undue wear and chattering of these members as the railway vehicle travels over the irregularities in a railway track.

It should be noted that as fluid under pressure flows from the upper face to the lower face of the strut piston 45 via the passageway 58 to cause equalization of pressure on the opposite faces of the strut piston 45, the continued supply of fluid under pressure by the brake controlling valve device 1 to the brake cylinder pipe 11 and thence to the upper faces of strut piston 45 and reset piston 54 via the side outlet of pipe T 66, pipe 65, flexible hose 64, pipe and passageway 33, branch passageway 35, and passageway 48, maintains the reset piston 54 against the resistance of spring 56 in the position in which the O-ring 57 carried thereby is disposed below the location at which the upper end of the passageway 58 opens at the wall surface of the counterbore 52. Consequently, fluid under pressure supplied from the brake cylinder pipe 11 to the upper face of the strut piston 45, subsequent to the return of this piston to the position in which it is shown in FIG. 3, flows to the lower face of this strut piston via the passageway 58 so that the pressure on each face of this piston increases simultaneously.

It will be noted that while the strut piston 45 occupies the position in which it is shown in FIG. 3, the O-rings 59 carried in the peripheral annular grooves adjacent the opposite ends of the strut piston 45 are respectively disposed above and below the location at which the passageway 44 opens at the wall surface of the counterbore 30. Consequently, subsequent to upward movement of the strut piston 45 by the spring 47 to the position shown in FIG. 3, no fluid under pressure can be vented from the chamber 43 above the piston-type valve 38 via the passageway 44. Furthermore, fluid under pressure is supplied at this time from the brake cylinder pipe 11 to the chamber 43 above the piston-type valve 38 via the side outlet of pipe T 66, pipe 65, flexible hose 64, pipe and passageway 33, branch passageway 35 and branch 35a. Consequently, the fluid under pressure thus supplied to the chamber 43 is effective to maintain the piston-type valve 38 in its lower position in which the elongated peripheral annular groove 41 thereon establishes the communication between the passageways 33 and 34, and the O-ring 42 carried in the peripheral annular groove adjacent the upper end of the piston-type valve 38 is disposed below the location at which the branch 35a opens at the wall surface of the bottom bore 29.

Since the elongated peripheral annular groove 41 on the piston-type valve 38 thus maintains the communication between the passageways 33 and 34, the fluid under pressure supplied from the auxiliary reservoir 3 by the brake controlling valve device 1 to the brake cylinder pipe 11 flows to the main pressure chamber 18 and compensating pressure chamber 22 in the brake cylinder device 5 until equalization of pressure occurs between the auxiliary reservoir 3 and the chambers 18 and 22.

*Release of a service application of brakes, on an empty vehicle*

When it is desired to effect a release of a service brake application, the pressure in the brake pipe 2 will be increased in the usual manner to cause the service slide valve (not shown) of the service portion 10 of the brake controlling valve device 1 to be returned to its release position so that a communication is established therethrough from the brake cylinder pipe 11 to the pipe 68 which is open to atmosphere since it has been assumed that the handle 72 of the pressure retaining valve device 69 occupies its "direct release" position.

Since the brake cylinder pipe 11 is now open to atmosphere and one end of this pipe is connected to the main pressure chamber 18 in the brake cylinder device 5, the fluid under pressure in the chamber 18 will thus be vented to atmosphere. Fluid under pressure will also be vented from the compensating chamber 22 in the brake cylinder device 5 to atmosphere since the chamber 22 is connected to the brake cylinder pipe 11 via pipe 23, flexible hose 67, pipe and passageway 34, elongated peripheral annular groove 41 on the piston-type valve 38 (FIG. 3), passageway and pipe 33, flexible hose 64, pipe 65 and the side outlet of pipe T 66. Since at this time the chamber 43 above the piston-type valve 38 is connected to the passageway 33 via the branch 35a and passageway 35, fluid under pressure will also be vented from the chamber 43 to atmosphere simultaneously as fluid under pressure is vented from the chambers 18 and 22 in the brake cylinder device 5.

Furthermore, fluid under pressure will be simultaneously vented from both the upper and lower face of the strut piston 45 since the reset piston 54 is now in the position in which the O-ring 57 carried thereon is disposed below the location at which the upper end of the passageway 58 in the piston 45 opens at the wall surface of the counterbore 52 and the upper face of the reset piston 45 is connected to the passageway 35 via the passageway 48 in the cover member 31. Fluid under pressure will thus be vented from the lower face of the strut piston 45 until the pressure above the reset piston 54 has been reduced sufficiently for the spring 56 to move the reset piston 54 upward to the position shown in FIG. 3 in which position the O-ring 57 carried thereby is disposed above the location at which the upper end of the passageway 58 opens at the wall surface of the counterbore 52 in the strut piston 45. Thereafter, fluid under pressure is completely vented from the lower face of the strut piston 45 to atmosphere via the passageway 58, counterbores 51 and 52, bottom bore 49 and cross bore 50.

Fluid under pressure will be vented from the chamber 43 above the piston-type valve 38 to atmosphere in the manner described above until the pressure in the chamber 43 is reduced sufficiently for the spring 40 to move the piston-type valve 38 upward until the upper O-ring 42 carried thereby is disposed above the location at which the branch 35a opens at the wall surface of the bottom bore 29. In this position of the piston-type valve 38 fluid will be trapped in the chamber 43 at a pressure corresponding to the value of the spring 40. However, in this position of the piston-type valve 38, the elongated peripheral annular groove 41 thereon cuts off communication between passageways 33 and 34 and the O-ring 42 carried in the peripheral annular groove adjacent the lower end of the piston-type valve 38 is disposed above the location at which the passageway 34 opens at the wall surface of the bottom bore 29. Therefore, fluid under pressure will be completely vented from the compensating chamber 22 in brake cylinder device 5 to atmosphere via pipe 23, flexible hose 67, pipe and passageway 34, bottom bore 29 and passageway 37.

Upon the complete venting of fluid under pressure from the main pressure chamber 18 and the compensating pressure chamber 22 to atmosphere in the manner described above, the spring 26 will move the brake cylinder piston 17 and hollow rod 25 to the position in which they are shown in FIG. 1 of the drawings to thereby effect a release of the service brake application.

*Service application of the brakes on a loaded vehicle*

Let it be supposed that the brake equipment shown in FIG. 1 has been charged in the manner hereinbefore described in detail and that the vehicle is fully loaded.

When the vehicle is fully loaded, one-half of the load is transmitted from the vehicle body to the bolster 7 of the truck at one end of the vehicle and the other half of the load is transmitted from the vehicle body to the bolster of the truck at the other end of the vehicle. The load transmitted to the bolster 7 shown in FIG. 1 is effective to compress a pair of springs 73 and 74 interposed between the bolster 7 and the truck spring plank 9 so that the bolster 7 and the load sensing valve device 6 are moved downward from the position they occupied when the vehicle was empty toward the truck spring plank 9 a distance proportional to the load on the bolster 7. Consequently, the distance between the bottom of the stop contact member 53 and the upper surface of the stop 8 will be such, due to the compression of the truck springs 73 and 74, that when a service brake application is effected in the manner hereinbefore described and fluid under pressure is supplied to the brake cylinder pipe 11 and thence to upper face of the strut piston 45, this piston 45 will be brought to a stop by the stop contact member 53 contacting the stop 8 before the O-ring 59 carried in the peripheral annular groove adjacent the upper end of the strut piston 45 is moved to a position below the location at which the passageway 44 opens at the wall surface of the counterbore 30. Therefore, no fluid under pressure is supplied to the chamber 43 via the passageway 44 and the piston-type valve 38 remains in a position in which the elongated peripheral annular groove 41 thereon cuts off communication between the passageways 33 and 34. Accordingly, no fluid under pressure supplied from the auxiliary reservoir 3 by the brake controlling valve device 1 to the brake cylinder pipe 11 and thence via the side outlet of pipe T 66, pipe 65, and flexible hose 64 to the pipe and passageway 33 can flow to the passageway 34 and thence to the compensating pressure chamber 22 in the brake cylinder device 5 and this chamber remains open to atmosphere via pipe 23, flexible hose 67, pipe and passageway 34, bottom bore 29 and passageway 37.

The fluid under pressure supplied from the auxiliary reservoir 3 to the brake cylinder pipe 11 flows to the main pressure chamber 18 in the brake cylinder device 5 until equalization of pressure occurs. Since the compensating pressure chamber 22 is open to atmosphere, as just explained, the fluid under pressure supplied to the main pressure chamber 18 acts on the entire effective area of the brake cylinder piston 17 to apply the brakes on the loaded vehicle, for a given reduction in pressure of the fluid in the brake pipe 2, to a degree in accordance with the fluid pressure force resulting from the fluid under pressure acting in only the main pressure chamber 18 over the entire effective area of the piston 17.

The fluid under pressure supplied from the brake cylinder pipe 11 to the upper face of the strut piston 45 and reset piston 54 will increase until the reset piston 54 is moved downward to a position in which the O-ring 57 carried thereon is disposed below the location at which the passageway 58 opens at the wall surface of the counterbore 52 whereupon equalization of pressure on the opposite faces of the strut piston 45 occurs and this piston is returned to the position shown in FIG. 3, in the manner hereinbefore described, to move the stop contact member 53 carried on the lower end of the piston rod 46 upward away from the stop 8.

*Release of a service application of brakes on a loaded vehicle*

When it is desired to effect a release of a service brake application, the pressure in the brake pipe 2 will be increased in the usual manner whereupon the fluid under pressure in the main pressure chamber 18 of the brake cylinder device 5 will be vented to atmosphere in the same manner as hereinbefore described in connection with effecting the release of a service brake application on an empty vehicle. This venting of fluid under pressure from the main pressure chamber 18 renders the spring 26 effective to move the brake cylinder piston 17 and the hollow rod 25 to the position in which they are shown in FIG. 1 of the drawings to thereby effect a release of the service brake application.

It will also be understood that fluid under pressure is vented from the upper faces of the strut piston 45 and the reset piston 54 in the same manner as hereinbefore described in connection with effecting the release of a service brake application on an empty vehicle.

Emergency application and release of brakes

An emergency brake application on both an empty and a loaded vehicle differs from a service brake application only in that when an emergency brake application is effected, fluid under pressure is supplied from both the auxiliary reservoir 3 and the emergency reservoir 4 to, when the vehicle is empty, the main pressure chamber 18 and the compensating pressure chamber 22, and when the vehicle is loaded, to only the main pressure chamber 18. By supplying fluid under pressure from both the auxiliary reservoir 3 and the emergency reservoir 4, a higher equalization pressure is obtained and therefore, a higher braking force is transmitted by the brake cylinder device 5 to the brake shoe (not shown) for pressing the brake shoe against the tread surface of the corresponding vehicle wheel.

The release of an emergency brake application on either an empty or a loaded vehicle is identical to the release of a service brake application.

DESCRIPTION—FIG. 2

In FIG. 2 of the drawings, there is shown an empty and load fluid pressure brake equipment constructed in accordance with a second embodiment of the invention. According to this second embodiment of the invention, the empty and load fluid pressure brake equipment shown in FIG. 2 differs from the empty and load fluid pressure brake equipment shown in FIG. 1 only in that the load sensing valve device is mounted in an inverted position and the two chamber compensating type brake cylinder device 5 is replaced by an empty brake cylinder device and a single chamber load brake cylinder device, the latter being operative only while the car is loaded, to transmit a braking force for effecting a brake application. Accordingly, like reference numerals have been used to designate the structure shown in FIG. 2 which is identical to that shown in FIG. 1. Only such features of the structure and operation of the embodiment of the invention shown in FIG. 2 which differ from that of the embodiment of FIG. 1 will be hereinafter described.

According to the embodiment of the invention disclosed in FIG. 2, the empty and load fluid pressure brake equipment shown in this figure comprises the brake controlling valve device 1 to which is connected the usual brake pipe 2, auxiliary reservoir 3, emergency reservoir 4, the load sensing valve device 6 which is mounted in an inverted position on one end of the truck bolster 7 which valve device 6 is movable vertically relative to a stop 75 secured to and carried on an unsprung part of a railway vehicle truck, such as, for example, a compression member 76 of a truck side frame, and an empty brake cylinder device 77, which may be of the standard type, and a single chamber load compensating brake cylinder device 78 which is connected to the load sensing valve device 6 in a manner hereinafter described in detail.

One end of the brake cylinder pipe 11 is connected to the brake cylinder passageway in the pipe bracket 13 of the brake controlling valve device 1, as in the first embodiment of the invention shown in FIG. 1 of the drawings, and the opposite end of the brake cylinder pipe 11 is connected to the left-hand end of a pipe T 79 shown in FIG. 2. The side outlet of the pipe T 79 is connected by a pipe 80 to the above-mentioned empty brake cylinder device 77 and the right-hand end of this pipe T 79 is connected by a pipe 81 to one end of a flexible hose 82 the opposite end of which is connected to the pipe and passageway 33 in the body 27 of the inverted load sensing valve device 6 shown in FIG. 2.

The above-mentioned single chamber load compensating brake cylinder device 78 is connected by a pipe 83 to one end of a second flexible hose 84 the opposite end of which is connected to the pipe and passageway 34 in the body 27 of the inverted load sensing valve device 6 shown in FIG. 2.

OPERATION—FIG. 2

Initial charging

In initially charging the empty and load brake equipment shown in FIG. 2, fluid under pressure supplied to the brake pipe 2 by the brake valve device (not shown) on the locomotive flows to the brake controlling valve device 1 to effect charging of the auxiliary reservoir 3 and emergency reservoir 4 in the same manner as in the first embodiment of the invention shown in FIG. 1 of the drawings. At this time a pressure chamber (not shown) in the empty brake cylinder device 77 is connected to atmosphere via pipe 80, pipe T 79, brake cylinder pipe 11, the brake controlling valve device, 1, the service and emergency portions 10 and 12 of which are, respectively, in their release position, the pipe 68 and the pressure retaining valve device 69 the handle 72 of which it may be assumed occupies its "direct position" in which the pipe 68 is open directly to atmosphere.

Also at this time, the single chamber (not shown) in the load compensating brake cylinder device 78 is open to atmosphere via the pipe 83, flexible hose 84, pipe and passageway 34 (FIG. 3) which opens at the wall surface of the bottom bore 29 below the piston-type valve 38 while it occupies the position in which it is shown, the bottom bore 29 and passageway 37.

Service application of the brakes on an empty vehicle

When it is desired to effect a service application of the brakes, the fluid pressure in the brake pipe 2 will be reduced in the usual manner to cause the brake controlling valve device 1 to effect the supply of fluid under pressure from the auxiliary reservoir 3 to the brake cylinder pipe 11 as in the first embodiment of the invention. Fluid under pressure thus supplied to the brake cylinder pipe 11 will flow to the pressure chamber in the empty brake cylinder device 77 via the side outlet of the pipe T 79 and pipe 80 to cause this brake cylinder device to effect a brake application on the empty vehicle, the brake force developed being in accordance with the size of this empty brake cylinder device and sufficient to properly brake an empty vehicle.

Fluid under pressure supplied to the brake cylinder pipe 11 also flows to the upper face of the strut piston 45 (FIG. 3) via the side outlet of pipe T 79, pipe 81, flexible hose 82, pipe and passageway 33, passageway 35 and passageway 48 to cause the strut piston 45 and piston rod 46 to move upward, as viewed in FIG. 2, until the stop contact member 53, carried on the end of the piston rod 46 is moved into contact with the lower side of the stop 75.

Since the vehicle is empty, the springs 73 and 74 are not compressed. Therefore, the stop contact member 53 is moved upward into contact with the stop 75 before the strut piston 45 has moved upward far enough to uncover that end of the passageway 44 that opens at the wall surface of the counterbore 30. Consequently, no fluid under pressure is supplied to the chamber 43 via the passageway 44 and the piston-type valve 38 remains in the position in which the elongated peripheral annular groove 41 thereon cuts off communication between the passageways 33 and 34. Accordingly, no fluid under pressure can flow from the passageway 33 to the passageway and pipe 34 and thence to the pressure chamber in the load compensating brake cylinder device 78 via the flexible hose 84 and pipe 83. Since no fluid under pressure is supplied to the load compensating brake cylinder device 78, only the empty brake cylinder device 77 is effective to brake the empty vehicle.

As fluid under pressure is supplied from the brake cylinder pipe 11 to the upper face of the strut piston 45 (FIG. 3) in the manner described above, the pressure thereon and on the upper face of the reset piston 54 increases until the reset piston 54 is moved downward against the yielding resistance of the spring 56 to cause equalization of pressure on the opposite faces of the strut piston 45 in the manner hereinbefore described whereupon the strut piston 45 is returned to the position shown in FIG. 3 thereby retracting the stop contact member 53 downward away from the stop 75 (FIG. 2) so that the vibration of the vehicle while in motion will not cause undue wear of the contact member 53 and stop 75.

*Release of a service application of brakes on an empty vehicle*

To effect a release of a service brake application, the pressure in the brake pipe 2 is increased to cause the brake controlling valve device 1 to operate in the manner hereinbefore described to release fluid under pressure from the brake cylinder pipe 11 to atmosphere. Since the empty brake cylinder device 77 is connected to the brake cylinder pipe 11 via the pipe 80 and pipe T 79, fluid under pressure will be released from this brake cylinder device thereby effecting a release of the service brake application on the vehicle.

Fluid under pressure will also be released from both faces of the reset piston 45 in the manner hereinbefore explained.

*Service application of the brakes on a loaded vehicle*

Let it be supposed that the brake equipment shown in FIG. 2 has been charged in the manner hereinbefore described and that the vehicle is fully loaded.

As in the first embodiment of the invention, one half of the load on the vehicle is transmitted to the bolster 7 at one end of the vehicle and this load on the bolster 7 is effective to compress the springs 73 and 74 so that the bolster and the load sensing valve device 6 shown in FIG. 2 are moved downward from the position they occupy when the vehicle is empty away from the stop 75 a distance proportional to the load on the bolster. Consequently, the distance between the stop contact member 53 and the bottom surface of the stop 75 will increase sufficiently for the strut piston 45 and piston rod 46 to move upwardly, as viewed in FIG. 2, against the yielding resistance of the spring 47 the full length of a stroke of the piston 45, or in other words, to a position in which the upper O-ring 59, as viewed in FIG. 3, carried by the strut piston 45 is disposed below the opening of the passageway 44 at the wall surface of the counterbore 30. Consequently, when a service brake application is effected in the manner hereinbefore explained, and fluid under pressure is supplied to the upper face, as viewed in FIG. 3 of the strut piston 45, this piston is moved its full length of stroke whereupon fluid under pressure is supplied to the chamber 43 via the passageway 44.

Fluid under pressure supplied to the chamber 43 in the manner just described is effective to move the piston-type valve 38 to the position in which the elongated peripheral annular groove 41 thereon establishes communication between the passageways 33 and 34.

When a service brake application is made, the brake controlling valve device 1 operates to supply fluid under pressure from the auxiliary reservoir 3 to the brake cylinder pipe 11 from whence it flows to the empty brake cylinder device 77 as hereinbefore explained.

Fluid under pressure supplied to the brake cylinder pipe 11 also flows therefrom to the single chamber of the load compensating brake cylinder device 78 via the side outlet of the pipe T 79, pipe 81, flexible hose 82, pipe and passageway 33, elongated peripheral annular groove 41 on the piston-type valve 38, passageway and pipe 34, flexible hose 84 and pipe 83. Therefore, the force of the load compensating brake cylinder device 78 is added to the force of the empty brake cylinder device 77 in effecting a brake application on a loaded vehicle.

*Release of a service application of brakes on a loaded vehicle*

The release of a service brake application on a loaded vehicle is effected by increasing the pressure in the brake pipe 2 to cause the brake controlling valve device 1 to operate, as hereinbefore described, to establish a communication through which fluid under pressure is vented from the brake cylinder pipe 11 to atmosphere. Since the empty brake cylinder device 77 is connected to the brake cylinder pipe 11 via the pipe 80 and the side outlet of pipe T 79, and the single chamber of the load compensating brake cylinder device 78 is connected to the brake cylinder pipe 11 via pipe 83, flexible hose 84, pipe and passageway 34, elongated peripheral annular groove 41, passageway and pipe 33, flexible hose 82, pipe 81 and pipe T 79, fluid under pressure will be simultaneously released from the empty brake cylinder device 77 and the load compensating brake cylinder device 78 to atmosphere to effect a release of the service brake application on the loaded vehicle.

It will be understood that in effecting a service brake application on a loaded vehicle, the pressure on opposite sides of the strut piston 45 is equalized to cause retraction of the stop contact member 53 from the stop 75 in the manner hereinbefore explained, and that in effecting a subsequent brake release fluid under pressure is released from both faces of the strut piston 45 in the same manner as hereinbefore explained.

It will also be understood that when an emergency brake application is effected, fluid under pressure is supplied from both the auxiliary reservoir 3 and emergency reservoir 4 to the brake cylinder pipe 11, as in the first embodiment of the invention, thereby giving a higher equalization pressure in the empty brake cylinder device 77 and the load compensating brake cylinder device 78 which in turn provides a greater braking force on the loaded car.

A release of an emergency brake application on a loaded vehicle is effected in the same manner as a release of a service brake application.

DESCRIPTION—FIG. 4

In FIG. 4 of the drawings, a third embodiment of an empty and load fluid pressure brake equipment is shown which is somewhat similar to the empty and load brake equipment shown in FIG. 2 but differs therefrom in that the load sensing valve device 6 shown in FIG. 2 includes integral therewith a double diaphragm type of self-lapping relay valve device 85 (FIG. 5) which may be substantially the same as the double diaphragm self-lapping relay valve device described in Patent 3,300,255 issued Jan. 24, 1967 to Francis R. Racki, and assigned to the assignee of the present application. The empty and load brake equipment shown in FIG. 4 further includes an additional supply reservoir 86 that is charged from the brake pipe 2 via the AB type brake controlling valve device 1 and a one-way check valve device 87, a dummy volume reservoir 88, and a pair of identical brake cylinder devices 89 and 90 which are carried respectively on two brake beams 91 and 92 associated with the truck at one end of a railway vehicle, it being understood that the truck at the opposite end of the vehicle is provided with a pair of identical brake cylinder devices and a pair of identical brake beams. The purposes of the dummy volume reservoir 88 is to add volume to the brake cylinder devices 89 and 90 to insure that when a brake application is made, the same equalization pressure between the auxiliary reservoir and the brake cylinder devices is obtained as in standard AB freight equipment using the AB type brake controlling valve device 1 and a single brake cylinder device. Accordingly, like reference numerals have been used to designate the structure shown in FIGS. 4 and 5 which is identical to that shown in FIGS. 2 and 3. Only such features of the structure and operation of the embodiment of the invention shown in FIG. 4 which differ from that of the embodiment of FIG. 2 will be hereinafter described.

According to the third embodiment of the invention disclosed in FIG. 4, the empty and load fluid pressure brake equipment shown in this figure comprises the well-known AB type brake controlling valve device 1 to which is connected the usual brake pipe 2, auxiliary reservoir 3, emergency reservoir 4, the above-mentioned supply reservoir 86 via a pipe 93 which is connected to one end of a pipe T 94 the side outlet of which is connected via a pipe 95 to the outlet of the above-mentioned one-way check valve device 87 the inlet of which is connected by a pipe 96 to a charging port (not shown) in the brake controlling valve device 1, the above-mentioned dummy volume reservoir 88 via a pipe 97 that is connected to the side outlet of a pipe T 98 to the left-hand end of which is connected the brake cylinder pipe 11, and the load sensing valve device 6 which is mounted in an inverted position on the end of the truck bolster 7, below the stop 75, as in FIG. 2, and has the passageway 33 therein connected to the right-hand end of the pipe T 98 by the corresponding pipe 33, a flexible hose 99 and a pipe 100.

The load sensing valve device 6 shown in FIG. 5 is substantially the same in construction as the load sensing valve device 6 shown in FIG. 3 except the branch passageway 35 has a second branch 35b that extends through the body 27 and opens at one end at the vertical face 32 formed thereon, and the body 27 is provided with two passageways 101 and 102 each of which opens at one end at the vertical face 32 and at the opposite end at a flat surface 103 formed on the bottom of the body 27.

Briefly, the double diaphragm self-lapping relay valve device 85 comprises a sectionalized casing embodying two casing sections 104 and 105 and two coaxially arranged movable abutments or diaphragms 106 and 107 of different effective area. The outer periphery of the larger diaphragm 107 is clamped between the casing sections 104 and 105 which are secured together by any suitable means (not shown).

The diaphragm 107 cooperates with the casing sections 104 and 105 to form within the relay valve device 85 and on opposite sides of the diaphragm, a first pair of chambers 108 and 109, the latter being open to the second branch 35b of the passageway 35 in the body 27 of the load sensing valve device 6 in a manner now to be explained.

The casing section 104 of the above-mentioned sectionalized casing of the relay valve device 85 is provided on one side thereof with a vertical face 110 that corresponds to the vertical face 32 of the body 27 of the load sensing valve device 6, in that opening at the surface of the vertical face 110 are the same number of ports as open at the surface of the vertical face 32, these ports being identically arranged therein and opening from corresponding passageways in the casing section 104 so that when a gasket 111, provided with ports therein corresponding in number and arrangement to the ports opening at the respective vertical faces 32 and 111, is placed between these two vertical faces, and the casing section 104 is rigidly secured to the body 27 by bolts or other suitable means (not shown), the passageways 34, 35b, 101 and 102 in the body 27 extend into corresponding passageways in the casing section 104.

The second branch 35b of the branch passageway 35 extends through the casing sections 104 and 105 of the sectionalized casing of the relay valve device 85 and opens into the chamber 109 formed in the sectionalized casing at the upper side of the diaphragm 107.

The casing section 104 of the double diaphragm self-lapping relay valve device 85 is provided with a bore 112 which opens at one end into a chamber 113 formed by the cooperative relationship between the lower end of the casing section 104 and a bottom cover member 114 secured to the casing section 104 by any suitable means (not shown). The opposite end of the bore 112 opens into the chamber 108. The casing section 104 is provided intermediate the ends of the bore 112 with an annular chamber 115 which is open to atmosphere via a strainer device 116. Slidably mounted in the bore 112 is a valve stem 117 having intermediate its ends a first collar 118 and a first portion of reduced diameter on the lower side of this collar which portion extends through two diaphragm followers 119 and 120 disposed on the opposite sides of the diaphragm 107. This first portion of reduced diameter of the stem 117 is screw threaded to receive a nut 121 that has screw-threaded engagement therewith to operatively connect the center of the diaphragm 107 to the diaphragm followers 119 and 120, and to the valve stem 117. Disposed within the chamber 108 between the casing section 104 and the diaphragm follower 119 and in surrounding relation to the valve stem 117 is a spring 122 for biasing the valve stem 117 and the diaphragm 107 in an upward direction so that the upper diaphragm follower 120 normally abuts a shoulder 123 formed on the casing section 105.

The valve stem 117 is provided with two identical spaced-apart peripheral annular grooves in each of which is disposed an O-ring 124 to prevent leakage of fluid under pressure between the periphery of the valve stem and the wall of the bore 112, and from the chambers 108 and 113 to the atmospheric chamber 115. A third O-ring 124 surrounds the stem 117 above diaphragm follower 119 and prevents flow of fluid under pressure between the chambers 108 and 109. The valve stem 117 between the intermediate and lower O-ring 124 carried thereon is provided with a crossbore which, as shown in FIG. 5 illustrating the relative positions of the parts of the double diaphragm self-lapping relay valve device 85 in the brake release position, is so located that the lower end of the bore 112 is open to atmosphere via a passageway 125 extending from the lower end of the valve stem 117 longitudinally therethrough to the location thereon of the crossbore and thence via the crossbore, the chamber 115 and strainer device 116.

A flat disc valve 126 is disposed in the chamber 113 which is supplied with fluid under pressure from the supply reservoir 86 via the passageway 102 one end of which opens into the chamber 113 and the opposite end of which is connected by a correspondingly numbered pipe to one end of a flexible hose 127 (FIG. 4) the opposite end of which is connected by a pipe 128 to the right-hand end of the hereinbefore-mentioned pipe T 94 the left-hand of which is connected by the pipe 93 to the supply reservoir 86. The flat disc valve 126 controls communication between the chamber 113 and the lower end of the bore 112 at the wall surface of which opens one end of the hereinbefore-mentioned passageway 101 that extends through the body 27, a corresponding port in the gasket 111, and the casing section 104. The other end of the passageway 101 is connected by a correspondingly numbered pipe to one end of a flexible hose 129 (FIG. 4) the opposite end of which is connected by a pipe 130 to the right-hand end of a first pipe T 131. The side outlet of the pipe T 131 is connected by a short pipe 132 to one end of a second pipe T 133 the opposite end of which is connected by a pipe 134 and a flexible hose 135 to the brake cylinder device 89 carried by the brake beam 91 at one end of the vehicle. The side outlet of the pipe T 133 is connected by a pipe 136 and a flexible hose 137 to the brake cylinder device 90 carried by the brake beam 92 also at the one end of the vehicle the flexible hoses 135 and 137 being necessary since the brake beams 91 and 92, which are slidably supported at their opposite ends by the truck side frames, move in opposite directions when a brake application is made. The left-hand end of the pipe T 131 is connected by a pipe 138 to the two brake cylinder devices (not shown) associated with the truck at the opposite end of the vehicle.

Coaxially arranged with the flat disc valve 126 (FIG. 5) and operatively connected thereto is a piston 139 which is sealingly slidable within a bore 140 formed in the bottom cover member 114 which bore 140 is coaxial with the bore 112 in the casing section 104. A spring 141, interposed between the piston 139 and the bottom cover member 114 urges the piston 139 and the flat disc valve 126 upward for normally seating the latter against an annular valve seat 142 formed at the lower end of the bore 112. The lower face of the piston 139 is constantly open to the passageway 101a extending through the bottom cover member 114 and the casing section 104 so that the lower face of the piston 139 is always subject to the pressure in the brake cylinder devices 89 and 90. The upper face of the piston 139 is always subject to the pressure of fluid in the chamber 113 and has an area equal to the seated area of the flat disc valve 126 or the area of the annular valve seat 142 so that the fluid pressure forces acting on the valve 126 when unseated are balanced.

The above-mentioned passageway 101 has a second branch passageway 101b opening into the chamber 108 via a choke 143 which controls the rate of flow of fluid under pressure to and from the chamber 108.

As shown in FIG. 5, the valve stem 117 has a portion of reduced diameter that extends above the first collar 118 to a second collar 144 against which rests the lower side of a first diaphragm follower 145 that is provided on its upper side with a screw-threaded stem that extends through a bore 146 in a second diaphragm follower 147 and receives a nut 148 whereby the center of the hereinbefore-mentioned smaller diaphragm 106 is clamped between the diaphragm followers 145 and 147.

A limited lost-motion connection between the diaphragm 106 and the valve stem 117 is provided by means of an arcuate skirt portion 149 that extends downward from the lower side of the diaphragm follower 145 and has formed integral therewith at its lower end a yoke 150 that fits around the stem 117 between the collars 118 and 144 thereon.

The outer periphery of the smaller diaphragm 106 is clamped between the casing section 105 and a cover member 151 which is secured to the casing section 105 by any suitable means (not shown) and which cooperates with the diaphragm 106 to form a chamber 152 into which opens the passageway 34 that extends from the body 27 of the load sensing valve device 6 through the casing sections 104 and 105 and the cover 151 of the double diaphragm relay valve device 85. Disposed in the chamber 152 and interposed between the cover 151 and the diaphragm follower 147 is a spring 153 for normally biasing the diaphragm 106 and diaphragm follower 145 to the position shown in which the diaphragm follower 145 abuts a stop 154 formed on the casing section 105. The strength of the spring 153 is such that a chosen pressure, such as, for example, ten pounds per square inch, is required in chamber 109 before diaphragm 106 can be deflected upward against the yielding resistance of spring 153.

OPERATION—FIG. 4

*Initial charging*

Fluid under pressure supplied to the brake pipe 2 in the manner described in connection with the first and second embodiments of the invention flows to the brake control valve device 1 to effect charging of the auxiliary reservoir 3 and the emergency reservoir 4 in the same manner as hereinbefore described in connection with the previous embodiments of the invention and to effect charging of the supply reservoir 86 via the pipe 96, one-way check valve device 87, pipe 95, pipe T 94 and pipe 93. At this time a pressure chamber (not shown) in the brake cylinder device 89 is connected to the pipe 130 via flexible hose 135, pipe 134, pipe T 133, pipe 132 and pipe T 131; a pressure chamber (not shown) in the brake cylinder device 90 is connected to the pipe 130 via flexible hose 137, pipe 136, side outlet of pipe T 133, pipe 132 and pipe T 131; and the corresponding pressure chambers in the brake cylinders located at the other end of the car are connected to the pipe 130 via pipe 138 and pipe T 131. Also at this time pipe 130 is open to atmosphere via flexible hose 129, pipe and passageway 101 (FIG. 5), bore 112, passageway 125 and the crossbore in the valve stem 117, chamber 115 and strainer device 116. Consequently, no fluid under pressure will be present in the pressure chambers of any of the brake cylinder devices 89 and 90.

It will be understood that fluid under pressure will be vented from both sides of the strut piston 45 shown in FIG. 5 in the same manner as hereinbefore described so that this piston occupies the position shown in FIG. 5 and the stop contact member 53 shown in FIG. 4 is disposed below and out of contact with the stop 75 as shown. Furthermore, since the chamber 109 (FIG. 5) in the relay valve device 85 is connected to the branch passageway 35 via the second branch 35b of this passageway 35, fluid under pressure will be vented from the chamber 109 at this time. Also, fluid under pressure will be vented from the chamber 152 to atmosphere at this time via the passageway 34, bottom bore 29 and passageway 37.

*Service application of the brakes on an empty vehicle*

A service brake application can be effected by reducing the pressure in the brake pipe 2 to cause the brake controlling valve device 1 to supply fluid under pressure to the brake cylinder pipe 11 in the manner hereinbefore described. Fluid under pressure supplied to the brake cylinder pipe 11 flows therefrom to the dummy volume reservoir 88 via the side outlet of pipe T 98 and pipe 97 and to the lower face, as viewed in FIG. 4 of the strut piston 45 via pipe T 98, pipe 100, flexible hose 99, pipe and passageway 33, branch passageway 35, and passageway 48 to cause the strut piston 45 and piston rod 46 to move upward, as viewed in FIG. 4, until the stop contact member 53 carried on the upper end of the piston rod 46 is moved into contact with the lower side of the stop 75.

Since the vehicle is empty, the springs 73 and 74 are not compressed. Therefore, the stop contact member 53 is moved upward into contact with the stop 75 before the strut piston 45 has moved upward, as viewed in FIG. 4, far enough to uncover that end of the passageway 44 that opens at the wall surface of the counterbore 30. Consequently, no fluid under pressure is supplied to the chamber 43 and the piston-type valve 38 remains in the position in which the elongated peripheral annular groove 41 thereon cuts off communication between the passageways 33 and 34. Accordingly, not any of the fluid under pressure supplied to the passageway 33 can flow to the chamber 152 in the relay valve device 85. However, a part of the fluid under pressure supplied to the passageway 33 flows to the chamber 109 in the relay valve device 85 via branch passageway 35 and branch 35b.

As the pressure in the chamber 109 increases from atmospheric pressure up to a pressure of, for example, ten pounds per square inch, the diaphragm 107 is deflected downward against the yielding resistance of the spring 122 to first move the lower end of the valve stem 117 into contact with the upper side of the flat disc valve 126 to close communication between the pressure chambers in the brake cylinder devices 89 and 90 at each end of the vehicle and atmosphere. As the diaphragm 107 continues to be deflected downward, subsequent to movement of the lower end of the valve stem 117 into contact with the upper side of the flat disc valve 126, this valve 126 and the piston 139 will be moved downward away from the annular valve seat 142 against the yielding resistance of the spring 141.

Subsequent to the unseating of the flat disc valve 126 from the annular valve seat 142, fluid under pressure will flow from the supply reservoir 86 to the pressure chamber in brake cylinder device 89 shown in FIG. 4 via pipe 93, pipe T 94, pipe 128, flexible hose 127, pipe and passageway 102, chamber 113 (FIG. 5), past unseated disc valve 126, bore 112, passageway and pipe 101, flexible hose 129 (FIG. 4), pipe 130, pipe T 131, pipe 132, pipe T 133, pipe 134, and flexible hose 135. A part of the fluid under pressure supplied to the pipe 132 in the manner just described will flow to the pressure chamber in the brake cylinder device 90 shown in FIG. 4 via the side outlet of the pipe T 133, the pipe 136 and the flexible hose 137. Furthermore, a part of the fluid under pressure supplied to the pipe 130 will flow to the pressure chambers in the brake cylinder devices located at the opposite end of the vehicle via the pipe T 131 and the pipe 138. Consequently, the brake cylinder devices 89 and 90 at each end of the vehicle are effective in response to the supply of fluid under pressure to their respective pressure chambers to move the corresponding brake beams 91 and 92 in opposite directions to apply the brake shoes carried thereby to the tread surface of the corresponding wheels so that a breaking force is applied substantially simultaneously to each of the eight wheels of the two-truck vehicle.

Some of the fluid under pressure supplied to the passageway 101 (FIG. 5) in the manner described above flows to the chamber 108 below the diaphragm 107 via the branch passageway 101b and the choke 143. The fluid under pressure thus supplied to the chamber 108 together with the force of the spring 122 acts on the diaphragm 107 in a direction opposite the fluid under pressure supplied to the chamber 109 so that upon equalization of the forces on the opposite sides of the diaphragm 107, the spring 141 is rendered effective to move the piston 139, flat disc valve 126 and valve stem 117 upward until the valve 126 is moved into contact with the annular valve seat 142 to cut off further flow of fluid under pressure to the brake cylinder devices 89 and 90 at each end of the vehicle.

The fluid under pressure supplied to the chamber 109 in the manner described above is effective on the lower side of the effective area of the smaller diaphragm 106. Accordingly, as the pressure in the chamber 109 increases above the hereinbefore-mentioned chosen pressure, such as, for example, ten pounds per square inch, the smaller diaphragm 106 and the diaphragm followers 145 and 147 will move upward against the yielding resistance of the spring 153 until the yoke 150 that is integral with the skirt portion 149 of the diaphragm follower 145 is moved into contact with the lower side of the collar 144 that is integral with the valve stem 117. Thereafter, as the pressure in the chamber 109 increases, it acts in a downward direction on an area equal to the difference in the effective area of the larger diaphragm 107 and that of the smaller diaphragm 106 to operate the flat disc valve 126 in the manner hereinbefore described to effect the supply of fluid under pressure to the pressure chambers in the brake cylinder devices 89 and 90 at each end of the vehicle and to the chamber 108 below the larger diaphragm 107.

The fluid under pressure supplied to the chamber 108 acts in an upward direction on the entire effective area of the larger diaphragm 107. Accordingly, when the force of the spring 122, together with the fluid pressure force acting in an upward direction on the diaphragm 107, substantially balances the differential fluid pressure force acting in a downward direction, the spring 141 will be rendered effective to move the diaphragm 107, valve stem 117 and piston 139 upward to seat the flat disc valve 126 on the annular valve seat 142 to cut off flow of fluid under pressure from the supply reservoir 86 to the pressure chambers in the brake cylinder devices 89 and 90 at the respective opposite ends of the vehicle. From the foregoing, it is apparent that pressure supplied to the pressure chambers of the brake cylinders 89 and 90 at each end of the vehicle and to the chamber 108 is less than the pressure supplied to the chamber 109 by an amount in accordance with the difference in the effective areas of the larger diaphragm 107 and the smaller diaphragm 106. It will be understood, however, that this pressure in the pressure chambers of the brake cylinder devices 89 and 90 at each end of the vehicle provides an adequate braking force for an empty vehicle.

It will be understood that when the pressure acting on the reset piston 64 (FIG. 5) is increased sufficiently to overcome the initial resistance of the spring 56, the pressure on the opposite faces of strut piston 45 will be equalized in the manner hereinbefore explained whereupon the stop member 53 (FIG. 4) will be retracted downward away from the stop 75 to the position shown.

*Release of a service application of brakes on an empty vehicle*

When it is desired to effect a release of a service brake application, the pressure in the brake pipe 2 will be increased in the usual manner whereupon the service portion 10 of the brake controlling valve device 1 will operate in the manner hereinbefore described in detail to establish a communication between the brake cylinder pipe 11 and atmosphere.

Since the brake cylinder pipe 11 is now open to atmosphere and one end of this pipe is connected to the dummy volume reservoir 88 via the side outlet of pipe T 98 and pipe 97, fluid under pressure will be vented from the dummy volume reservoir 88 to atmosphere.

Fluid under pressure will also be vented from the chamber 109 in the double diaphragm self-lapping relay valve device 85 since this chamber is connected to the brake cylinder pipe 11 via the second branch 35b of the branch passageway 35, branch passageway 35, passageway and pipe 33, flexible hose 99, pipe 100, and pipe T 98.

As fluid under pressure is vented from the chamber 109, as just described, the fluid under pressure in the chamber 108 and the force of the spring 122 are rendered effective to deflect the diaphragm 107 upward and thereby lift the valve stem 117 upward to the position shown in FIG. 5 whereupon a communication hereinbefore described is established between the pressure chambers in the brake cylinder devices 89 and 90 at each end of the vehicle and atmosphere to release the fluid under pressure therefrom to cause movement of the brake shoes carried by the brake beam 91 and 92 at each end of the vehicle away from the tread surface of their corresponding wheels thereby releasing the brakes on the vehicle.

*Service application of the brakes on a loaded vehicle*

Let it be supposed that the brake equipment shown in FIG. 4 has been charged in the manner hereinbefore described and that the vehicle is fully loaded.

The load transmitted in the manner hereinbefore described to the bolster 7 is effective to compress the springs 73 and 74 shown in FIG. 4 so that the bolster 7, the load sensing valve device 6 and the double diaphragm self-lapping relay valve device 85 are moved downward from the position shown in FIG. 4 toward the spring plank 9 a distance proportional to the load on the bolster 7. Consequently, the distance between the stop contact member 53 and the bottom of the stop 75 will be such, due to the compression of the truck springs 73 and 74, that when a service brake application is effected in the manner hereinbefore described to cause the strut piston 45 to move upward, as viewed in FIG. 4, until the stop contact member 53 strikes the bottom of the stop 75, this piston will be moved to the position to allow the flow of fluid under pressure to the chamber 43 (FIG. 5) above the piston-type valve 38 via the passageway 44.

Upon the fluid under pressure supplied to the chamber 43 increasing the pressure therein sufficiently to move the piston-type valve 38 against the yielding resistance of the spring 40 to the position in which the elongated peripheral annular groove 41 establishes a communication between the passageways 33 and 34, fluid under pressure will flow from the passageway 33 to the chamber 152 above the smaller diphragm 106 via the peripheral annular groove 41 and passageway 34 simultaneously as fluid under pressure flows from the passageway 33 to the chamber 109 via branch passageway 35 and second branch 35b.

The simultaneous supply of fluid under pressure to the chambers 109 and 152 acts on the opposite sides of the effective area of the smaller diaphragm 106 to balance the opposing fluid pressure forces acting on this diaphragm and thereby render it ineffective.

The fluid under pressure supplied to the chamber 109 acts in a downward direction on the entire effective area of the diaphragm 107 to deflect this diaphragm in the direction to first move the valve stem 117 downward to the position in which the lower end thereof abuts the upper face of the flat disc type valve 126 to close communication between the pressure chambers in the brake cylinder devices 89 and 90 at each end of the vehicle and atmosphere, and thereafter effect unseating of the valve 126 from the annular valve seat 142 whereupon fluid under pressure flows from the supply reservoir 86 to the brake cylinder devices 89 and 90 at each end of the vehicle to effect a service brake application.

Fluid under pressure supplied to the brake cylinder devices 89 and 90 also flows to the chamber 108 below the larger diaphragm 107 via the choke 143 where it acts in an upward direction over the entire effective area of this diaphragm. Consequently, when the pressure in the chamber 108 is increased to substantially the same value as that in the chamber 109, the opposing fluid pressure forces acting on the diaphragm 107 will be balanced whereupon the spring 141 will effect reseating of the flat disc valve 126 on annular valve seat 142 to cut off further supply of fluid under pressure to the pressure chambers in the brake cylinder devices 89 and 90 and the chamber 108.

Since fluid under pressure is supplied to the chamber 108 until it substantially equals the pressure in the chamber 109, it is apparent that this pressure, which is the same as that in the pressure chambers of the brake cylinder devices 89 and 90 at the opposite ends of the vehicle, provides for a greater braking force on the loaded vehicle than is provided for an empty vehicle.

It will be understood that when effecting a service brake application on a fully loaded vehicle, the pressure is equalized on the opposite sides of the strut piston 45 in the manner hereinbefore described so that this piston is returned to the position shown in FIG. 5 thereby retracting the stop contact member 53 (FIG. 4) downward away from the stop 75, as in the previous embodiments of the invention.

*Release of a service application of brakes on a loaded vehicle*

To release a service brake application on a loaded vehicle, the pressure in the brake pipe 2 is increased to its normal charged value to cause the brake controlling valve device 1 to operate to establish a communication between the brake cylinder pipe 11 and atmosphere as in the previous embodiments of the invention.

The chamber 152 in the double diaphragm self-lapping relay valve device 85 is connected to the passageway and pipe 33 via passageway 34 and elongated peripheral annular groove 41; the chamber 109 in the relay valve device 85 is connected to the passageway and pipe 33 via second branch 35b of the passageway 35 and the passageway 35; the chamber 43 above piston-type valve 38 is connected to the branch passageway 35 via the first branch 35a; and the pipe 33 is connected to the brake cylinder pipe 11 via the flexible hose 99, pipe 100 and pipe T 98. Consequently fluid under pressure will now be vented from the chambers 152, 109 and 43 to atmosphere.

As fluid under pressure is vented from the chambers 152 and 109 in the double diaphragm self-lapping relay valve device 85, the fluid under pressure present in the chamber 108 in this valve device, together with the spring 122, are rendered effective to deflect the diaphragm 107 upward to move the valve stem 117 to the position shown in FIG. 5 whereupon fluid under pressure is vented from the brake cylinder devices 89 and 90 at each end of the vehicle to atmosphere in the manner hereinbefore described in detail to cause a release of the brakes.

As in the other embodiments of the invention, when an emergency brake application is effected, fluid under pressure from both the auxiliary reservoir 3 and emergency reservoir 4 is supplied to the brake cylinder devices 89 and 90 to give a higher equalization pressure and therefore a higher braking force than is obtained when a service brake application is effected. A release of an emergency brake application is effected in the same manner as a release of a service brake application.

DESCRIPTION—FIGS. 6 AND 7

FIG. 6 of the drawings shows an empty and load fluid pressure brake equipment constructed in accordance with a fourth embodiment of the invention. According to this fourth embodiment of the invention, the empty and load fluid pressure brake equipment shown in FIG. 6 differs from the empty and load fluid pressure brake equipment shown in FIG. 4 in that the dummy volume reservoir is omitted, in that the load sensing valve device 6 includes integral therewith a single diaphragm type of self-lapping relay valve device 155 (FIG. 7), and in that the pair of identical brake cylinder devices 89 and 90 shown in FIG. 4, and located at each end of the vehicle, are replaced by an empty brake cylinder device 156 and a single chamber load brake cylinder device 157, the latter being operative only while the car is loaded to transmit a braking force for effecting a brake application. Accordingly, like reference numerals have been used to designate the structure shown in FIG. 6 which is identical to that shown in FIG. 4. Only such features of the structure and operation of the embodiment of the invention shown in FIG. 6 which differ from that of the embodiment of FIG. 4 will be hereinafter described.

According to the fourth embodiment of the invention disclosed in FIG. 6, this empty and load fluid pressure brake equipment comprises the well-known AB type brake controlling valve device 1 to which is connected the usual brake pipe 2, auxiliary reservoir 3, emergency reservoir 4, the supply reservoir 86, the load sensing valve device 6 which is mounted in an inverted position on one end of the truck bolster 7, as in FIGS. 2 and 4, and which is movable vertically relative to the stop 75 that is secured to and carried on an unsprung part of a railway vehicle turck, such as, for example, the compression member 76 of a truck side frame, and the empty brake cylinder device 156 which may be of the standard type as is the empty brake cylinder device 77 shown in FIG. 2, and the single chamber load compensating brake cylinder device 157 which may be substantially the same in construction as the load brake cylinder device 78 shown in FIG. 2 and which is connected to the single diaphragm type of self-lapping relay valve device 155 in a manner hereinafter described in detail.

As in the first embodiment of the invention shown in FIG. 1, one end of the brake cylinder pipe 11 is connected to the brake cylinder passageway in the pipe bracket 13 of the brake controlling valve device 1 and the opposite end of this pipe 11 is connected to the upper end of a pipe T 158 the lower end of which is connected by a pipe 159 to a pressure chamber (not shown) in the empty brake cylinder device 156. The side outlet of the pipe T 158 is connected by a pipe 160 to one end of a flexible hose 161 that has its opposite end connected to the pipe 33 that in turn is connected to the correspondingly numbered passageway in the load sensing valve device 6 shown in FIG. 6 which, as hereinbefore-mentioned, includes integral therewith the single diaphragm type of self-lapping relay valve device 155.

The single diaphragm type of self-lapping relay valve device 155 shown in FIGS. 6 and 7 is identical in construction to the double diaphragm type self-lapping relay valve device 85 shown in FIG. 5 except the casing section 105, smaller diaphragm 106, diaphragm followers 145 and 147, valve stem 117, spring 153, and cover member 151 are omitted, and the outer periphery of the larger diaphragm 107, as shown in FIG. 7 on sheets 3 of the drawings, is clamped between the casing section 104 and a top cover member 162 secured to this casing section by any suitable means (not shown), it being noted from FIG. 7 that the top cover member 162 is provided with

23 a passageway 163 therein one end of which is in alignment with that end of the hereinbefore-mentioned passageway 34 extending through the body 27 of the load sensing valve device 6 and the casing section 104 that is opposite the end of this passageway 34 that opens at the wall surface of the bottom bore 29 in the body 27. The opposite end of the passageway 163 opens into a chamber 164 formed above the diaphragm 107 by the cooperative relationship of this diaphragm and the top cover member 162 which is provided on its lower side with a recess 165 in which is disposed a gasket 166 that serves to form a seal about that end of the second branch 35b of the branch passageway 35 that opens at the upper flat face formed on the casing section 104. The gasket 166 is provided with a port therein corresponding in arrangement to the ports opening the aligning ends of the passageways 34 and 163 so that when the gasket 166 is placed between the top cover member 162 and the casing section 104 these passageways communicate one with the other in order that fluid under pressure may be supplied to and released from the chamber 164 in a manner hereinafter described.

Slidably mounted in the bore 112 in the casing section 104 is a valve stem 167 which replaces the valve stem 117 shown in FIG. 5. As shown in FIG. 7, the valve stem 167 has formed integral therewith at its upper end a collar 168 that abuts the upper side of the upper annular diaphragm follower 120 between which and the lower annular diaphragm follower 119 the center of the diaphragm 107 is clamped by the nut 121 that has screw-threaded engagement with a screw-threaded portion of the stem 167.

In order to prevent leakage of fluid under pressure between the chambers 108 and 164, an O-ring 169 is disposed between the collar 168 and the lower annular diaphragm follower 119 and in surrounding relation to the valve stem 167.

The delivery passageway 101 in the single diaphragm type self-lapping relay valve device 155 shown in FIGS. 6 and 7 is connected by a corresponding pipe bearing the same numeral to one end of the flexible hose 129 (FIG. 6) the opposite end of which is connected by the pipe 130 to the pressure chamber (not shown) in the load compensating brake cylinder device 157 shown in FIG. 6.

OPERATION—FIGS. 6 AND 7

*Initial charging*

Fluid under pressure supplied to the brake pipe 2 shown in FIG. 6 in the manner described in connection with the previous embodiments of the invention effects charging of the brake equipment shown in FIG. 6 in the same manner as hereinbefore described for the brake equipment shown in FIG. 4. At this time the pressure chamber in the empty brake cylinder device 156 is connected to the vented brake cylinder pipe 11 via the pipe 159 and pipe T 158, and the pressure chamber in the load compensating brake cylinder device 157 is open to atmosphere via pipe 130, flexible hose 129, pipe and passageway 101, bore 112 (FIGS. 5 and 7), the cross bore in the valve stem 167, chamber 115 and strainer device 116.

It will be understood that fluid under pressure is vented from both sides of the strut piston 45 of the load sensing valve device 6 shown in FIG. 6 in the same manner as hereinbefore described in connection with the previous embodiments of the invention so that this piston 45 occupies its retracted position and the stop contact member 53 shown in FIG. 6 is disposed below and out of contact with the stop 75 as shown.

Furthermore, the chamber 164 (FIG. 7) in the single diaphragm type relay valve device 155 is connected to atmosphere via the passageway 162 in the top cover member 163, passageway 34 extending through the casing section 104 and body 27, bottom bore 29 (FIG. 5) and passageway 37.

24

Also, the chamber 108 is connected to the passageway 101 via the choke 143 and branch passageway 101b, and the passageway 101 is open to atmosphere via bore 112, passageway 125 in valve stem 167 (FIG. 7), the cross bore in this valve stem, the chamber 115 and strainer device 116. Since chambers 108 and 164 on opposite sides of the diaphragm 107 (FIG. 7) are both vented to atmosphere at this time, the spring 122 is rendered effective to bias the valve stem 167, diaphragm 107 and diaphragm followers 119 and 120 to the position shown in FIG. 7 in which the upper diaphragm follower 120 abuts the top cover member 162.

*Service application of the brakes on an empty vehicle*

A service application of the brakes can be effected by reducing the pressure in the brake pipe 2 to cause the brake controlling valve device 1 to supply fluid under pressure to the brake cylinder pipe 11 in the manner hereinbefore described. Fluid under pressure supplied to the brake cylinder pipe 11 will flow to the pressure chamber in the empty brake cylinder device 156 via the pipe T 158 and pipe 159 to cause this brake cylinder device to effect a brake application on the empty vehicle, the braking force developed being sufficient to adequately brake an empty vehicle.

Fluid under pressure supplied to the brake cylinder pipe 11 also flows to the lower face, as viewed in FIG. 6 of the strut piston 45 via the side outlet of pipe T 158, pipe 160, flexible hose 161, pipe and corresponding passageway 33 (FIG. 5), branch passageway 35, and passageway 48 to cause the strut piston 45 and piston rod 46 to move upward, as viewed in FIG. 6, until the stop contact member 53 (FIG. 6) carried on the end of piston rod 46 is moved into contact with the lower side of the stop 75.

Since the vehicle is empty, springs 73 and 74 are not compressed. Therefore, the stop contact member 53 is moved upward into contact with the stop 75 before the strut piston 45 uncovers the passageway 44 (FIG. 5). Consequently, no fluid under pressure is supplied to the chamber 43 and the piston-type valve 38 is not moved to the position in which the elongated peripheral annular groove 41 thereon establishes communication between the passageways 33 and 34. Therefore, no fluid under pressure is supplied to the chamber 164 (FIG. 7) of the single diaphragm self-lapping relay valve device 155. Accordingly, this relay valve device 155 is not operated to effect the supply of fluid under pressure to the pressure chamber of the load brake cylinder device 157 (FIG. 6). Hence, only the empty brake cylinder device 156 is effective to brake the empty vehicle.

It will be understood that the strut piston 45 operates in the manner hereinbefore described to retract the stop contact member 53 downward out of contact with the stop 75 as in the previous embodiments of the invention so that undue wear of these pressure members is prevented.

*Release of a service application of brakes on an empty vehicle*

An increase of pressure in the brake pipe 2 subsequent to a service brake application causes the brake controlling valve device 1 to establish a communication between the brake cylinder pipe 11 and atmosphere in the manner hereinbefore described. Accordingly, fluid under pressure will be vented from the empty brake cylinder device 156 to cause a release of the brakes on the vehicle since the pressure chamber in the brake cylinder device 156 is connected to the brake cylinder pipe 11 via pipe 159 and pipe T 158.

Fluid under pressure will also be vented from both faces of the strut piston 45 as in the previous embodiments of the invention.

*Service application of the brakes on a loaded vehicle*

Assuming that the brake equipment shown in FIG. 6 has been previously charged in the manner hereinbefore described; that the vehicle is fully loaded; and that a reduction in the pressure in the brake pipe 2 is effected in the usual manner, fluid under pressure will be supplied to the lower face, as viewed in FIG. 6 of the strut piston 45 as previously described in connection with effecting a service brake application when the vehicle was empty.

One half of the load on the vehicle is transmitted to the bolster 7 to deflect the springs 73 and 74 as in the previous embodiments of the invention. Consequently, the bolster 7, the single diaphragm self-lapping relay valve device 155 and the load sensing valve device 6 are moved downward away from the stop 75 to such a position that when fluid under pressure is supplied to the bottom face, as viewed in FIG. 6 of the strut piston 45, this piston 45 will be moved upward far enough to uncover that end of the passageway 44 (FIG. 5) that opens at the wall surface of the counterbore 30 before the stop contact member 53 (FIG. 6) strikes the stop 75. Consequently, the fluid under pressure supplied to the bottom face, as viewed in FIG. 6, of the strut piston 45 will flow to the chamber 43 (FIG. 5) and move the piston-type valve 38 to the position in which the elongated peripheral annular groove 41 thereon establishes a communication between the passageways 33 and 34.

Subsequent to the establishment of a communication between the passageways 33 and 34 in the manner just described, some of the fluid under pressure supplied from the brake cylinder pipe 11 to the passageway 33 in the manner hereinbefore described will flow to the chamber 164 (FIG. 7) via the passageway 34. Fluid under pressure thus supplied to the chamber 164 in the single diaphragm self-lapping relay valve device 155 is effective to deflect the diaphragm 107 downward against the yielding resistance of the spring 122 to first move the lower end of the valve stem 167 into contact with the upper side of the flat disc type valve 126 (FIG. 5) to close communication between the pressure chamber in the load brake cylinder device 157 (FIG. 6) and atmosphere and thereafter effect unseating of the valve 126 from the annular valve seat 142.

When the flat disc type valve 126 (FIG. 5) is unseated in the manner just explained, fluid under pressure will flow from the supply reservoir 86 (FIG. 6) to the pressure chamber in the load brake cylinder device 157 via pipe 93, pipe T 94, pipe 128, flexible hose 127, pipe and passageway 102 (FIG. 5), chamber 113, past unseated valve 126, bore 112, passageway and pipe 101, flexible hose 129 (FIG. 6) and pipe 130. Some of the fluid under pressure supplied past the unseated valve 126 to the passageway 101 flows to the chamber 108 (FIG. 7) via branch passageway 101b and choke 143 where it acts in an upward direction on the effective area of the diaphragm 107. Consequently, when the pressure in the chamber 108 is increased to substantially the same value as that in the chamber 164, the opposing fluid pressure forces acting on the diaphragm 107 will be balanced whereupon the spring 141 (FIG. 5) will effect reseating of valve 126 on the annular valve seat 142 to cut off further supply of fluid under pressure to the pressure chamber in the load brake cylinder device 157 (FIG. 6) and the chamber 108 (FIG. 7).

From the foregoing, it is apparent that the force of the load brake cylinder device 157 is added to the force of the empty brake cylinder device 156 in effecting a brake application on a loaded vehicle. Consequently, this additional force provides for adequately braking the loaded vehicle.

*Release of a service application of brakes on a loaded vehicle*

The release of a service brake application on a loaded vehicle is effected by increasing the pressure in the brake pipe 2 to cause the brake controlling valve device 1 to operate, as hereinbefore described, to establish a communication between the brake cylinder pipe 11 and atmosphere whereupon fluid under pressure will be vented from the pressure chamber in the empty brake cylinder device 156 since this chamber is connected to the pipe 11 via pipe 159 and pipe T 158.

Fluid under pressure will also be vented from the chamber 164 (FIG. 7) in the single diaphragm self-lapping relay valve device 155 to atmosphere via passageway 34, elongated peripheral annular groove 41 on piston-type valve 38 (FIG. 5), passageway and pipe 33, flexible hose 161 (FIG. 6), pipe 160, the side outlet of the pipe T 158, and the vented brake cylinder pipe 11.

As fluid under pressure is vented from the chamber 164 in the single diaphragm self-lapping relay valve device 155 (FIG. 7) as just described, the fluid under pressure in the chamber 108 and the force of the spring 122 are rendered effective to deflect the diaphragm 107 upward and thereby operate the self-lapping relay valve device 155 in the same manner as hereinbefore described for the self-lapping relay valve device 85 to release fluid under pressure from the pressure chamber in the load brake cylinder device 157 (FIG. 6) to atmosphere via pipe 130, flexible hose 129, pipe and passageway 101 (FIGS. 5 and 7), bore 112 (FIG. 5), the passageway 125 and crossbore in the valve stem 167 (FIG. 7), chamber 115 and strainer device 116. The release of fluid under pressure from the pressure chamber in the empty brake cylinder device 156 and from the pressure chamber in the load brake cylinder device 157 (FIG. 6) effects a release of the brakes on the loaded vehicle.

An emergency brake application and a subsequent release of the emergency application differ from a service application and release in the same manner as in the preceding embodiments of the invention.

DESCRIPTION—FIG. 8

FIG. 8 of the drawings shows a railway vehicle truck that has two side frames 170, only one of which appears in FIG. 8. Each side frame 170 is provided with a truck spring plank 9, as in the previous embodiments of the invention, for supporting a pair of springs 73 and 74 upon which rests one end of the truck bolster 7 that supports one end of a center sill 171 of a railway vehicle body 172. Secured to the center sill 171 substantially above the truck bolster 7 by any suitable means, such as, for example, welding, is a body bolster 173.

According to a fourth embodiment of the invention shown in FIG. 8, an empty and load fluid pressure brake equipment comprising the same elements as the first embodiment of the invention shown in FIG. 1 of the drawings, has the brake controlling valve device 1 secured to the bottom of the vehicle body 172 by any suitable means (not shown). The brake pipe 2 which extends from end to end of the vehicle, has a branch connected to the brake controlling valve device 1 as in the preceding embodiments of the invention. The auxiliary reservoir 3 and the emergency reservoir 4 are, as in the commercial form of the well-known AB brake equipment, combined into one reservoir which is divided into two compartments and which is made up of three castings—a separation plate and two flanged chambers which are identical except that one is provided with a single supporting lug and the other with two. These lugs 174 (FIG. 8) provide means by which the two compartment reservoir may be secured by any suitable means, such as for example, bolts and nuts to one end of each one of a pair of brackets 175, the opposite end of which is secured, for example, as by welding, to the center sill 171.

As shown in FIG. 8, the brake cylinder device 5 is secured by any suitable means (not shown) to a bracket 176 which in turn is secured as, for example, by welding to the bottom of the body bolster 173.

Also, as shown in FIG. 8, the cover member 31 of the load sensing valve device 6 is secured as, for example, by welding, to the bottom of the body bolster 173 closely adjacent as practical to the brake cylinder device 5 and directly above a stop member 177 which may be in the form of a T that has its top secured to the side frame 170 as, for example, by four rivets 178. It should be understood that the stop member 177 is of sufficient size so that the leg of the T is always in the path of the stop contact member 53 carried on the lower end of the piston rod 46 of the load sensing valve device 6 regardless of the angular position that the vehicle truck assumes relative to the vehicle body 172, center sill 171, and body bolster 173 while the vehicle is traveling around a curve. Consequently, the flexible hoses 64 and 67 shown in FIG. 1 of the drawings are not necessary. Therefore, the pipe 65 is connected to the passageway 33 (FIG. 3) and the pipe 23 is connected to the passageway 34 in this embodiment of the invention.

As shown in FIG. 8 of the drawings, the hollow rod 25 of the brake cylinder device 5 is provided with a push rod 179 having on its exterior end a clevis 180 the jaws of which are disposed on opposite sides of a dead brake lever 181 intermediate the ends thereof and pivotally connected thereto as by a pin 182.

The upper end of the dead lever 181 is pivotally connected, as by a pin 183, to a clevis 184 that in turn is secured by any suitable means to the floor or underside of the vehicle body 172. The lower end of the dead lever 181 is disposed between the jaws formed at one end of a double-jaw clevis 185 and connected thereto as by a pin 186. The jaws formed at the opposite end of the double-jaw clevis 185 are arranged at an angle of 90° to the jaws at the one end and receive therebetween one end of a link member 187 which is pivotally connected thereto as by a pin 188. The other end of the link member 187 is connected as by a pin 189 to the jaws of a clevis formed at the upper end of a live brake lever 190.

Intermediate its ends the live brake lever 190 is pivotally connected to a first brake beam (not shown) that carries at each end thereof a brake head 191 only one of which appears in FIG. 8 of the drawings. Each brake head 191 is suspended from the corresponding truck side frame 170 by a brake head hanger 192 and is provided with a brake shoe 193 for exerting a braking force on the tread surface of a corresponding wheel of the vehicle truck when forced or pressed into braking contact therewith.

The lower end of the live brake lever 190 is provided with a clevis whereby this lever is pivotally connected as by means such as, for example, a pin 194 to one end of a link 195 the opposite end of which is pivotally connected as by means such as, for example, a pin 196 to a clevis formed at the lower end of a second dead brake lever 197.

The upper end of the second dead brake lever 197 is provided with a clevis whereby this brake lever is pivotally connected as by means such as, for example, a pin 198 to an offset arm 199 that is integral with the track side frame 170. Intermediate its ends, the second dead brake lever 197 is pivotally connected to a second brake beam (not shown) which, like the first brake beam, carries at each end thereof a brake head 200 only one of which appears in FIG. 8. Each brake head 200 is suspended from the corresponding truck side frame 170 by a brake head hanger 201 and is provided with a brake shoe 202 for exerting a braking force on the tread surface of a corresponding wheel of the vehicle truck when forced or pressed into braking contact therewith in a manner hereinafter explained.

OPERATION—FIG. 8

It will be understood that the operation of the empty and load fluid pressure brake equipment shown in FIG. 8, while the vehicle is empty and also while it is loaded, is identical to the operation of the empty and load fluid pressure brake equipment shown in FIG. 1. Hence, a detailed description of the operation of the brake equipment shown in FIG. 8 is believed to be unnecessary. It may be noted, however, that upon the supply of fluid under pressure to the brake cylinder device 5 in the manner hereinbefore described in connection with the first embodiment of the invention shown in FIG. 1, the push rod 179 shown in FIG. 8 is moved in the direction of the right hand.

As can be seen from FIG. 8 of the drawings, movement of the push rod 179 in the direction of the right hand effects counterclockwise rocking of the dead brake lever 181 about the pin 183. Since the lower end of the dead brake lever 181 is connected to the upper end of the live brake lever 190 via pin 186, double jaw clevis 185, pin 188, link member 187, and pin 189, and the live brake lever 190 is pivotally connected intermediate its ends to the right-hand brake beam, counterclockwise rocking of the dead brake lever 181 about the pin 183 is effective to cause clockwise rocking of the live brake lever 190 about its pivotal connection with the right-hand brake beam.

The lower end of the live brake lever 190 is pivotally connected by the pin 194 to the right-hand end of the link 195 and the left-hand end of this link is pivotally connected by the pin 196 to the lower end of the dead brake lever 197, the upper end of which is pivotally connected by the pin 198 to the off-set arm 199 that is intgral with the truck side frame 170. Therefore, as the live brake lever 190 is rocked clockwise in the manner described above, it is effective to move the link 195 in the direction of the left-hand, as viewed in FIG. 8, to cause clockwise rocking of the dead brake lever 197 about the pin 198.

As hereinbefore stated, the dead brake lever 197 is pivotally connected intermediate its ends to the left-hand brake beam. Therefore, clockwise rocking of the dead brake lever 197 about the pin 198 in the manner described above is effective to move the left-hand brake beam in the direction of the left hand to cause the two brake shoes 202 carried by the pair of brake heads 200, one adjacent each end of this brake beam, to be brought into braking contact with the tread surface of a corresponding truck wheel.

Subsequent to the brake shoes 202 being brought into braking contact with the tread surface of a corresponding truck wheel, the dead brake lever 197 can be rocked no further in a clockwise direction. Consequently, the pin 194 becomes the fulcrum for the live brake lever 190 so that as the push rod 179 of the brake cylinder 5 continues to be moved in the direction of the right hand to effect continued counterclockwise rocking of the dead brake lever 181 about the pin 183, the live brake lever 190 is rocked clockwise about the pin 194 since the upper end of this lever 190 is connected to the lower end of the dead brake lever 181 via pin 189, link member 187, pin 188, double jaw clevis 185 and pin 186. Since the live brake lever 190 is pivotally connected intermediate its ends to the right-hand brake beam, the above described clockwise rocking of this lever 190 about the pin 194 is effective to move this brake beam in the direction of the right hand until the two brake shoes 193 carried by the pair of brake heads 191, one adjacent each end of this brake beam, are brought into braking contact with the tread surface of a corresponding truck wheel.

After the two brake shoes 193 are brought into braking contact with the tread surface of a corresponding wheel, the fluid pressure force acting on the piston 17 (FIG. 1) of the brake cylinder device 5 (FIG. 8) is effective to transmit a force to the push rod 179 which acts in the direction of the right hand, as viewed in FIG. 8, and is effective through the above-described linkage to force each of the two brake shoes 193 and each of the two brake shoes 202 against the tread surface of the corresponding truck wheel to cause substantial equal braking on each wheel of the four wheel truck.

When a release of a brake application is effected in the same manner as described in connection with the first embodiment of the invention, fluid under pressure will be vented from the brake cylinder device 5 to atmosphere whereupon the release spring 26 (FIG. 1) moves the brake cylinder piston 17 in a brake release direction to the position shown (FIG. 1). As the piston 17 is thus moved in the direction of the left hand, it should be understood that, due to the action of gravity, the two brakehead-carrying brake beams that are respectively suspended from the truck side frames 170 by the brake head hangers 192 and 201, tend to return to their normal symmetrical relation with respect to the truck bolster 7 in which position the clearance between the brake shoes on one brake beam and their associated wheels is substantially equal to the clearance between the brake shoes on the other brake beam and their associated wheels.

From the foregoing description of the several embodiments of the invention, it should be apparent that the load sensing valve device 6 is a very versatile device in that it is capable of being used along or in combination with a plurality of types of self-lapping relay valve devices, and with the elements comprising the well-known AB single capacity fluid pressure freight brake equipment to provide several types of empty and load fluid brake equipments that will meet the braking requirements of most any type of railway vehicle now used on American railroads.

Having now described the invention, what I claim as new and desire to secure by Letters Patent is:

1. In an empty and load fluid pressure brake equipment for a vehicle having a sprung part and an unsprung part, the combination of:
    (a) a brake pipe normally charged with fluid under pressure,
    (b) a reservoir normally charged to the pressure in said brake pipe,
    (c) braking means for effecting a brake application,
    (d) a fluid pressure responsive brake control valve device operative upon a reduction in the pressure in said brake pipe to effect the supply of fluid under pressure from said reservoir to said braking means to cause a brake application,
    (e) a stop carried by the unsprung part of the vehicle, and
    (f) a change-over valve means carried by the sprung part of the vehicle, said change-over valve means comprising:
        (i) a fluid pressure operated change-over valve controlling the degree of braking effected by said braking means and operable by fluid under pressure from a first position in which said change-over valve renders said braking means effective to cause a first chosen degree of braking on the vehicle to a second position in which said change-over valve renders said braking means effective to cause a second chosen degree of braking on the vehicle, and
        (ii) fluid pressure operated load-measuring means movable sequentially into and out of contact with said stop by fluid under pressure supplied to said braking means in response to each operation of said brake control valve device, said load-measuring means controlling the supply of fluid under pressure to said change-over valve to cause positioning thereof accordingly as the car is empty or loaded each time a brake application is effected.

2. An empty and load fluid pressure brake equipment, as claimed in claim 1, further characterized in that said braking means comprises a pair of brake cylinder devices, and in that said fluid pressure operated change-over valve, in its first position, effects the supply of fluid under pressure to only one of said pair of brake cylinder devices whereby said braking means causes said second chosen degree of braking on the vehicle, and, in its second position, effects the supply of fluid under pressure to each of said pair of brake cylinder devices whereby said braking means causes said first chosen degree of braking on the vehicle.

3. An empty and load fluid pressure brake equipment, as claimed in claim 1, further characterized in that said load measuring means comprises:
    (a) a fluid motor including:
        (i) a cylinder having a bore at the wall surface of which opens one end of a passageway in communication with said fluid pressure operated change-over valve,
        (ii) a piston slidably mounted in the bore of said cylinder,
        (iii) resilient means for yieldably resisting movement of said piston in the bore of said cylinder to a position in which said piston opens the end of said passageway to the interior of said cylinder whereupon fluid under pressure supplied by said brake control valve device flows to said fluid pressure operated change-over valve, and
        (iv) spring-biased valve means controlling flow of fluid under pressure from one side of said piston to the other side, said valve means being operable in response to the pressure on said one side reaching a chosen pressure to cause equalization of pressure on the opposite sides of said piston to thereby render said resilient means effective to move said piston from the position in which it opens the end of said passageway to the interior of said cylinder to a position in which the end of said passageway is closed by said piston whereby said piston prevents release of fluid under pressure from said fluid pressure operated change-over valve via said passageway.

4. An empty and load fluid pressure brake equipment, as claimed in claim 1, further characterized by a fluid pressure operated relay valve device for effecting the supply of fluid under pressure to and the release of fluid under pressure from said braking means, and in that said fluid pressure operated change-over valve device so controls the operation of said fluid pressure operated relay valve device as to determine the degree of braking caused by said braking means.

5. In an empty and load fluid pressure brake equipment for a vehicle having a sprung body and an unsprung wheel truck side frame, the combination of:
    (a) a brake pipe normally charged with fluid under pressure to a certain chosen pressure,
    (b) a reservoir carried on said sprung body and normally charged to the pressure carried in said brake pipe,
    (c) braking means carried on said sprung body for effecting a brake application,
    (d) a fluid pressure responsive brake control valve device carried on said sprung body and operative upon a reduction in the pressure in said brake pipe to effect the supply of fluid under pressure from said reservoir to said braking means to cause a brake application,
    (e) a stop carried on said unsprung side frame, and
    (f) a load sensing valve device carried on said sprung body and cooperative with said stop on said unsprung side frame for respectively, sensing the load on the vehicle and causing said braking means to effect a degree of braking on the vehicle in accordance with the load thereon, said load sensing valve device comprising:
        (i) a fluid pressure operated valve operable from a first position in which it renders said braking means effective to cause a first degree of braking on the vehicle to a second position in which it renders said braking means effective to cause a second degree of braking on the vehicle that is less than said first degree of braking, (ii) a cylinder raving a bore, (iii) means providing a first communication through which the fluid under pressure supplied from said reservoir to said braking means in response to operation of said brake control valve device flows respectively to said fluid pressure operated valve only subsequent to the operation thereof from its said first position to its second position, and to one end of the bore in said cylinder, (iv) a spring-biased piston sealably and slidably mounted in said cylinder and having a piston rod disposed in alignment with said stop and movable into contact therewith by the fluid under pressure supplied to the one end of the bore in said cylinder, (v) means providing a second communication through which the fluid under pressure supplied to the one end of the bore in said cylinder flows from the interior of the bore to said fluid pressure operated valve, the flow through the second communication being obtained only in response to maximum travel of said piston in said cylinder, said maximum travel only occuring while said sprung body is a certain chosen distance from said stop carried on said unsprung side frame dependent upon the load carried by said sprung body, and (vi) spring-biased valve means carried by said piston and operable upon the pressure supplied to one side of said piston via the one end of the bore in said cylinder reaching a chosen value to cause equalization of pressure on opposite sides of said piston, said equalization of pressure being effective to cause said spring-biased piston to move said piston rod out of contact with said stop.

6. An empty and load fluid pressure brake equipment, as claimed in claim 5, further characterized in that said spring-biased valve means is operative in response to a chosen reduction in pressure on said side of said piston subsequent to said equalization of pressure on said opposite side of said piston to completely release fluid under pressure from the other side of said piston to atmosphere.

7. In an empty and load fluid pressure brake equipment for a vehicle having a load-carrying sprung part and an unsprung part, a load sensing valve device carried on said load-carrying sprung part for measuring the load carried thereon, said load sensing valve device comprising:

(a) a casing carried on said sprung part and provided with two spaced-apart bores and a plurality of passageways two of which open at the wall surface of one of said bores intermediate the ends thereof and a third of which opens at one end into one end of said one bore and at the opposite end at the wall surface of the other of said two bores intermediate the ends thereof, (b) a piston-type valve sealably and slidably mounted in said one bore, said piston-type valve being provided thereon with an elongated peripheral annular groove, (c) biasing means interposed between said piston-type valve and the other end of said one bore for normally biasing said piston-type valve to a first position in which the elongated peripheral annular groove thereon closes communication between said two passageways, (d) a piston sealably and slidably mounted in the other of said two spaced-apart bores for controlling flow of fluid under pressure therefrom to the one end of said one bore via said third passageway to cause movement of said piston-type valve from its said first position to a second position in which the elongated peripheral annular groove thereon establishes a communication between said two passageways, (e) biasing means interposed between said piston and one end of said other bore for normally biasing said piston to a first position in which it closes said third third passageway, (f) means providing a communication through which fluid under pressure is supplied to the other end of said other bore to cause movement of said piston from its said first position to a second position in which fluid under pressure supplied to said other end of said other bore flows to said one end of said one bore to cause said piston-type valve to be moved from its said one position to its said second position, (g) a piston rod operatively connected to said piston and shifted thereby into contact with the unsprung part of the vehicle when fluid under pressure is supplied to the other end of said other bore to cause movement of said piston against the yielding resistance of the second said biasing means, and (h) spring-biased valve means carried by said piston and operable by the fluid under pressure supplied to the other end of said other bore to cause equalization of pressure on opposite sides of said piston, said equalization of pressure rendering the second said biasing means effective to shift said piston reversely from its said second to its said first position to move said piston rod out of contact with the unsprung part of the vehicle and trap therein fluid under pressure previously supplied to said piston-type valve via said third passageway.

8. A load sensing valve device, as claimed in claim 7, further characterized in that said means providing a communication through which fluid under pressure is supplied to the other end of said other bore also provides for the supply of fluid under pressure to said piston-type valve subsequent to its movement to its said second position, whereby, upon release of said fluid under pressure, the first said biasing means is rendered effective to shift said piston-type valve reversely from its said second position to its said first position notwithstanding prior shifting of said piston reversely from its said second position to its said first position to trap fluid under pressure supplied to said piston-type valve.

9. A load sensing valve device, as claimed in claim 7, further characterized by a relay valve device operable for supplying a control fluid pressure, and in that said piston-type valve controls the supply of fluid under pressure to said relay valve device to cause operation thereof.

10. A load sensing valve device, as claimed in claim 7, further characterized by a double diaphragm type of relay valve device operable for supplying different degrees of control fluid pressure and in that said piston-type valve so controls the supply of fluid under pressure to said double diaphragm type relay valve device that while said piston-type valve occupies its first position, fluid under pressure may be supplied to only the adjacent sides of the two diaphragms of said double diaphragm type relay valve device to effect operation thereof to supply one degree of control fluid pressure and that while said piston-type valve occupies its second position, fluid under pressure may be supplied to the adjacent sides of said two diaphragms and also to the other side of one of said two diaphragms to effect operation thereof to supply a different degree of control fluid pressure.

11. A load sensing valve device, as claimed in claim 7, further characterized in that said piston and said piston rod cooperate to carry means providing a communication through which fluid under pressure can be released from one side of said piston upon release of fluid under pressure from the opposite side of said piston via said means providing a communication through which fluid under pressure is supplied to the other end of said other bore.

12. A load sensing valve device, as claimed in claim 7, further characterized in that a fourth one of said plurality of passageways in said casing opens the opposite end of said one bore to atmosphere.

13. A load sensing valve device, as claimed in claim 7, further characterized in that said piston is provided with a counterbore open to one side thereof and a passageway having one end open at the wall surface of said counterbore and having its opposite end open to the opposite side of said piston, and in that said spring-biased valve means comprises:
   (a) a cylindrical valve member slidably and sealably mounted in the counterbore in said piston,
   (b) a stop carried by said piston, and
   (c) a spring interposed between said valve member and the end of the counterbore in said piston for normally biasing said valve member against said stop in which position said valve member closes communication between the counterbore and passageway in said piston,
   (d) said valve member being movable against the yielding resistance of said spring by fluid under pressure supplied to the one side of said piston to a second position in which it opens a communication between the counterbore and passageway in said piston to cause said equalization of pressure on the opposite sides thereof.

14. A load sensing valve device, as claimed in claim 7, further characterized in that said piston carries thereon a pair of spaced-apart sealing elements that, upon return of said piston from its said second position to its said first position, form seals with the wall surface of the other of said two spaced-apart bores respectively above and below the opening of the opposite end of said third passageway at said wall surface thereby to prevent flow of fluid under pressure from said third passageway respectively to atmosphere and to the other end of said bore.

15. In a fluid pressure braking system for a railway vehicle having a sprung part and an unsprung part, the combination of:
   (a) brake cylinder means having two pressure chambers, which, when fluid under pressure is supplied to one of said pressure chambers, effects a brake application of one degree and, when fluid under pressure is concurrently supplied to both pressure chambers, effects a brake application of a different degree, and
   (b) a load sensing valve device comprising:
      (i) a casing carried by one of said vehicle parts, said casing having two chambers therein,
      (ii) piston valve means operable in one of said chambers from a normal position to which it is biased to an extended position responsive to fluid under pressure supplied concurrently to a pressure face of said piston valve means and to one of said brake cylinder pressure chambers,
      (iii) a stem carried by said piston valve means effective in the extended position of said piston valve means to contact the other of said vehicle parts to determine the extent of travel of the piston valve means out of its normal position depending on the degree of deflection of the sprung vehicle part out of its minimum load position,
      (iv) means providing a communication opened by said piston valve means when the travel thereof out of its normal position exceeds a certain amount for communicating fluid under pressure from the pressure face of the piston valve means to a second one of said chambers, and
      (v) a piston valve device operable responsive to fluid pressure communicated to said second one of said chambers via said communication for controlling the supply of fluid under pressure acting on the pressure face of said piston valve means, to the other of said brake cylinder pressure chambers.

16. A load sensing valve device, as claimed in claim 7, further characterized in that a fourth one of said plurality of passageways in said casing provides a communication through which fluid under pressure supplied to the other end of said other bore is supplied to said piston-type valve subsequent to its movement to its second position whereby it is maintained in its second position notwithstanding shifting of said piston reversely from its said second position to its said first position by said second biasing means subsequent to the equalization of pressure on the opposite sides of said piston.

17. A load sensing valve device for use on a vehicle having a sprung part and an unsprung part to register the degree of load on the sprung part according to the amount of deflection of the sprung part relative to the unsprung part from a position in which the load is a minimum, said load sensing device comprising the combination of:
   (a) a casing carried by one of said vehicle parts, said casing having two chambers therein,
   (b) piston valve means operable in one of said chambers from a normal position, to which it is biased, to an extended position responsive to fluid under pressure supplied to a pressure face of said piston valve means,
   (c) a stem carried by said piston valve means effective in the extended position of said piston valve means to contact the other of said vehicle parts to determine the extent of travel of the piston valve means out of its normal position dependent on the degree of deflection of the sprung vehicle part out of its minimum load position,
   (d) means providing a communication opened by said piston valve means when the travel thereof out of its normal position exceeds a certain amount for communicating fluid under pressure from the pressure face of the piston valve means to a second one of said chambers,
   (e) a piston valve device operable responsive to fluid under pressure communicated to said second one of said chambers via said communication for controlling the supply of fluid under pressure to a device to be controlled,
   (f) means including a pressure equalizing communication between the opposite pressure faces of said piston valve means, and
   (g) spring means for restoring said piston valve means from its extended position to its normal position subsequent to equalization of pressure on the opposite pressure faces of said piston valve means via said equalizing means.

18. A load sensing valve device for use on a vehicle having a sprung part and an unsprung part to register the degree of load on the sprung part according to the amount of deflection of the sprung part relative to the unsprung part from a position in which the load is a minimum, said load sensing device comprising the combination of:
   (a) a casing carried by one of said vehicle parts, said casing having two chambers therein,
   (b) piston valve means operable in one of said chambers from a normal position, to which it is biased, to an extended position responsive to fluid under pressure supplied to a pressure face of said piston valve means,
   (c) a stem carried by said piston valve means effective in the extended position of said piston valve means to contact the other of said vehicle parts to determine the extent of travel of the piston valve means out of its normal position dependent on the degree of deflection of the sprung vehicle part out of its minimum load position,
   (d) means providing a communication opened by said piston valve means when the travel thereof out of its normal position exceeds a certain amount for communicating fluid under pressure from the pressure face of the piston valve means to a second one of said chambers, (e) a piston valve device operable responsive to fluid under pressure communicated to said second one of said chambers via said communication for controlling the supply of fluid under pressure to a device to be controlled, (f) a normally closed valve carried by said piston valve means, said valve being operative to open position responsive to a predetermined pressure acting on the pressure face of the piston valve means to establish a pressure equalizing communication between the pressure face of the piston valve means and its opposite face, and, (g) spring means for restoring said piston valve means and said stem to their normal positions upon substantial equalization of pressure on said piston valve means.

References Cited
UNITED STATES PATENTS

| | | | |
|---|---|---|---|
| 2,155,226 | 4/1939 | Renshaw | 303—22 |
| 3,136,588 | 6/1964 | McClure | 303—22 X |

EUGENE G. BOTZ, *Primary Examiner.*